United States Patent [19]
Ohmi et al.

[11] Patent Number: 6,052,377
[45] Date of Patent: Apr. 18, 2000

[54] ACCESS CONTROL METHOD IN COMMUNICATION SYSTEM

[75] Inventors: Shinichiro Ohmi, Toyono; Hiroshi Oue, Neyagawa, both of Japan

[73] Assignee: Matsushita Electric Co., Ltd., Osaka-fu, Japan

[21] Appl. No.: 08/863,334

[22] Filed: May 27, 1997

[30] Foreign Application Priority Data

May 28, 1996 [JP] Japan ................................. 8-133123

[51] Int. Cl.[7] ................................. H04J 3/16; H04J 3/02; H04L 12/403; H04L 12/42
[52] U.S. Cl. ........................ 370/437; 370/449; 370/462
[58] Field of Search .................................. 370/442, 443, 370/437, 449, 450, 458, 346, 347, 348, 438, 439, 459, 462

[56] References Cited

U.S. PATENT DOCUMENTS 4,466,096  8/1984  Heins et al. .
4,742,512  5/1988  Akashi et al. ............................. 370/96
5,012,469  4/1991  Sardana ................................... 370/95.3
5,274,841  12/1993  Natarajan et al. ..................... 455/33.4
5,506,837  4/1996  Söllner et al. .
5,564,025  10/1996  De Freese et al. .
5,818,825  10/1998  Corrigan et al. ........................ 370/329

Primary Examiner—Dang Ton
Assistant Examiner—David R. Vincent
Attorney, Agent, or Firm—Wenderoth, Lind & Ponack, L.L.P.

[57] ABSTRACT

A down-link frame generating/transferring portion 12 detects a free channel from among a plurality of previously assigned up-link channels. The down-link frame generating/transferring portion 12 selects a secondary station 2 to which the free channel is to be assigned by referring to an address table 11 every time it detects a free channel. Then the down-link frame generating/transferring portion 12 sends out onto a down-link channel a down-link frame in which the secondary station address of the selected secondary station is set in an address slot corresponding to the free channel.

23 Claims, 12 Drawing Sheets

FIG. 3

| ORDER "n" | 1 | 2 | 3 | 4 | 5 | 6 | 7 | 8 | 9 | 10 | 11 |
|---|---|---|---|---|---|---|---|---|---|---|---|
| SECONDARY STATION ADDRESS | a | b | c | d | e | f | g | h | i | j | k |

111

AS1 ~ AS5 : ADDRESS SLOTS
ch1 ~ ch5 : UP-LINK CHANNELS
a ~ k : SECONDARY STATION ADDRESSES

FIG. 13

| ORDER "n" | 1 | 2 | 3 | 4 | 5 | 6 | 7 | 8 | 9 | 10 | 11 | 12 |
|---|---|---|---|---|---|---|---|---|---|---|---|---|
| SECONDARY STATION ADDRESS | a | b | c | d | e | a | f | g | h | i | j | k |

FIG. 14

| FIRST ORDER "n1" | 1 | 2 | 3 | 4 | 5 | SECOND ORDER "n2" | 1 | 2 | 3 | 4 | 5 | 6 |
|---|---|---|---|---|---|---|---|---|---|---|---|---|
| SECONDARY STATION ADDRESS | a | b | c | d | e | SECONDARY STATION ADDRESS | f | g | h | i | j | k |
| | | FIRST GROUP | | | | | | | SECOND GROUP | | | |

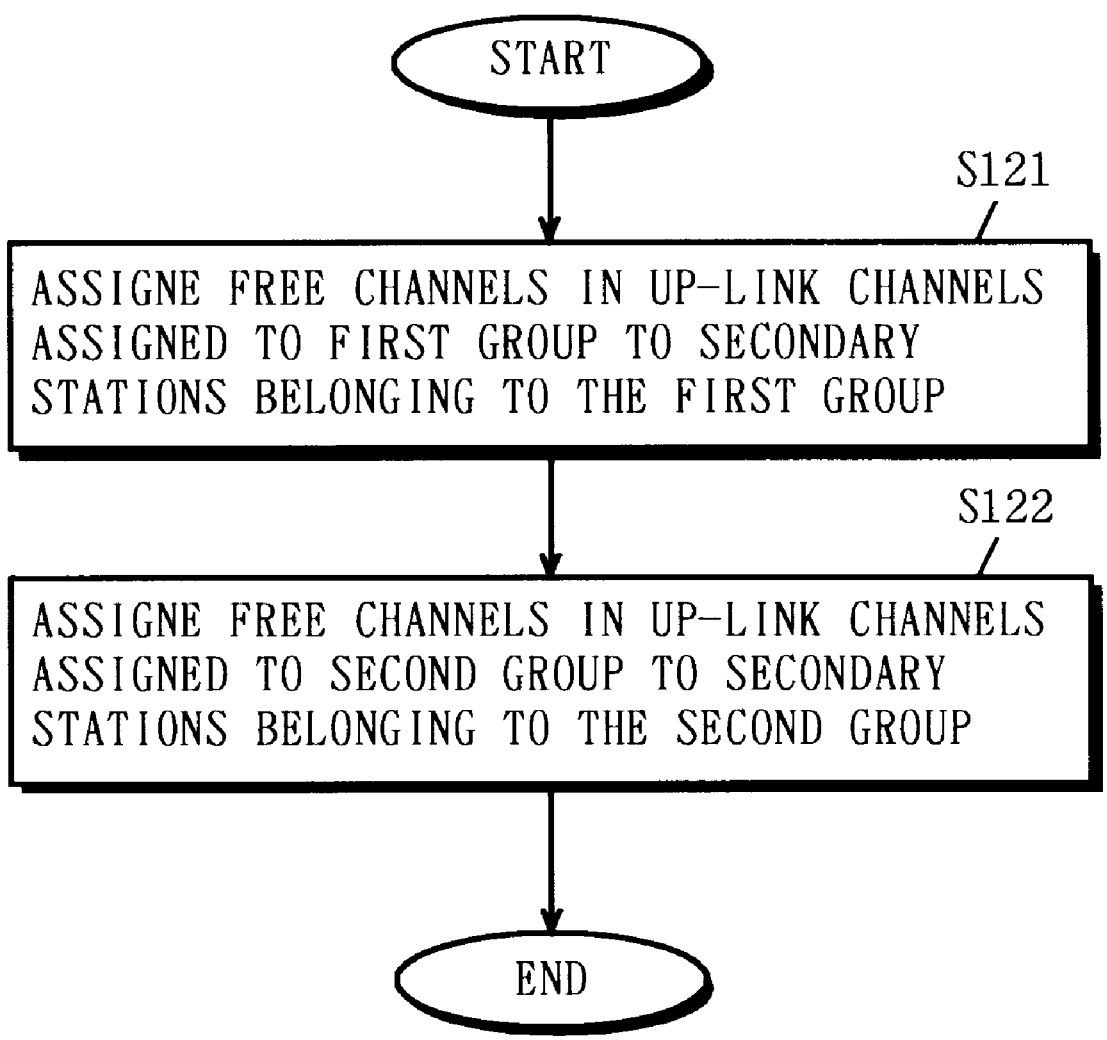

ACCESS CONTROL METHOD IN COMMUNICATION SYSTEM

BACKGROUND OF THE INVENTION

1. Field of the Invention

The present invention relates to access control methods, and more particularly to an access control method in a communication system using a point-to-multipoint network structure.

2. Description of the Background Art

The recent trend toward relaxation of regulations in broadcastings and communications has facilitated fusion of the two and experiments are being conducted for two-way communications using cable television networks and the like. In a communication system using a point-to-multipoint network structure such as the cable television system, a master station assigns communication channels to secondary stations. The secondary stations communicate with the master station by using the communication channels assigned. In the polling system, which is one of the methods for assigning the communication channels, a master station asks the secondary stations whether they have transmission messages. When a large number of secondary stations are accommodated in a communication system, however, there has been a conventional problem that it takes long before a transmission message is actually sent out after being generated in a certain secondary station.

The method explained below is suggested to solve this problem to accommodate a large number of secondary stations in a communication system. That is to say, the secondary stations are divided into some groups and the communication channels are assigned to the groups. Then the master station asks the secondary stations, group by group, whether they have transmission messages.

When the method described above is applied, however, a large number of secondary stations in a certain group (hereinafter referred to as "a first group") may have transmission messages while only a small number of secondary stations have transmission messages in another group (hereinafter referred to as "a second group"). That is to say, a traffic difference occurs between the groups. Then the secondary stations belonging to the first group will require a long time before actually sending out a transmission message after it is generated. Furthermore, if the traffic on the communication channels assigned to the first group is congested in spite of the fact that the communication channels assigned to the second group are not being used, the secondary stations belonging to the first group can not communicate until a communication channel assigned to the first group becomes free. This brings about the problem that the secondary stations in the first group provide extremely lower response and throughput than those in the second group. That is to say, the method above produces the problem that the communication channels (frequencies, for example) can not be efficiently used in the communication system.

SUMMARY OF THE INVENTION

Accordingly, an object of the present invention is to provide an access control method in a communication system which enables effective utilization of the communication channel to provide improved response and throughput of secondary stations accommodated in the communication system.

To achieve this object, the present invention includes the following first to twenty-third aspects, thereby providing the following effects.

A first aspect is directed to a method for controlling access from secondary stations to a master station in a communication system in which the master station and a plurality of secondary stations can bi-directionally communicate, wherein the master station can use a down-link channel to transfer down-link signals and each of the secondary stations can use a plurality of up-link channels to transfer up-link signals, wherein the master station detects currently unused one(s) of the up-link channels (hereinafter referred to as "a free channel") and selects one(s) of the secondary stations of a number corresponding to the detected free channel(s), assigns each free channel to each selected secondary station, and generates a down-link signal for signaling the free channel(s) assigned to the selected secondary station(s) and sends out the down-link signal onto the down-link channel, and the secondary stations determine whether the up-link channels are assigned to these stations on the basis of the down-link signal inputted from the down-link channel.

In accordance with the first aspect, the master station selects a secondary station every time a free channel occurs and individually assigns the free channel to the selected secondary station. Hence, even if a certain secondary station makes a communication by using a certain up-link channel in a long time, the master station can, when another up-link channel becomes free, assign the up-link channel to another secondary station. The up-link channels are then always being assigned to some of the secondary stations. Then, if a traffic is congested on an up-link channel, it affects not only a particular certain secondary station but also affects all secondary stations in a dispersed manner. This improves the response and throughput of all the secondary stations accommodated in the communication system.

According to a second aspect, in the first aspect, each secondary station sends out the up-link signal onto one of the up-link channels assigned thereto only when any of the up-link channels is assigned to this station and it has data to send out to the master station.

In accordance with the second aspect, the secondary stations do not send out up-link signals indicating that they have no data to send out to the master station onto the assigned up-link channels. Hence, the secondary stations do not require a structure for performing such transferring processing. This simplifies the structures of the secondary stations and the master station.

According to a third aspect, in the second aspect, the master station detects whether an up-link signal is being transferred on each up-link channel in a certain period after sending out the down-link signal to detect a free channel.

As stated above, the secondary stations may not send out up-link signals even when the up-link channels are assigned thereto. If, for example, the secondary stations send out up-link signals to indicate the absence of up-link signals to be transferred to the master station onto the assigned up-link channels, the master station is required to determine whether the up-link channels are free or not on the basis of the up-link signals. Then the master station requires a long time to generate a down-link signal. According to the third aspect, however, when no up-link signal is sent out onto each up-link channel in a certain period after a down-link signal was sent out, the master station can recognize the up-link channel as a free channel and can generate a down-link signal at once. This improves the response and throughput of all secondary stations accommodated in the communication system.

According to a fourth aspect, in the third aspect, the up-link signal includes an error detecting code, wherein the master station detects whether an error is occurring in a received up-link signal on the basis of the error detecting code included in the up-link signal, and when an error is occurring in the received up-link signal, the master station selects a secondary station other than the secondary station to which the up-link channel carrying the up-link signal was assigned, and assigns the up-link channel carrying the received up-link signal to the selected secondary station.

According to a fifth aspect, in the third aspect, the master station detects whether up-link signals are causing a communication collision on the up-link channels assigned to the secondary stations, wherein when detecting the communication collision, the master station selects a secondary station other than the secondary station to which the up-link channel suffering the communication collision is assigned, and assigns the up-link channel suffering the communication collision to the selected secondary station.

When an up-link signal contains an error or a plurality of up-link signals are causing a communication collision, the data communication from the secondary station to the master station is invalid. If the up-link channel keeps being assigned to this secondary station, the invalid data communication occupies the up-link channel to prevent effective utilization of the up-link channel. Hence, in the fourth or fifth aspect, when the master station detects an error in an up-link signal or a communication collision of up-link signals, it assigns the up-link channel, to which that up-link signal was sent out, to a newly selected secondary station to remove the invalid data communication from the up-link channel. This improves the utilization efficiency of the up-link channels.

According to a sixth aspect, in the third aspect, an order for assigning the up-link channels to the secondary stations is determined in advance, wherein the certain order is stored in the master station, and the master station selects the secondary stations according to the stored certain order to assign detected free channels.

In accordance with the sixth aspect, the master station can select secondary stations to assign up-link channels simply by referring to the certain order without difficulty. This also allows the certain order for assigning the up-link channels to be freely and easily changed.

According to a seventh aspect, in the sixth aspect, the certain order is determined so that all secondary stations are equally selected by the master station.

According to the seventh aspect, all secondary stations are equally affected when the traffic is congested since all secondary stations are equally selected by the master station. This improves the response and the throughput of all secondary stations accommodated in the communication system.

According to an eighth aspect, in the sixth aspect, the certain order is determined so that a particular secondary station is selected by the master station unequally to other secondary stations.

In accordance with the eighth aspect, when the order is determined so that a particular secondary station is unequally selected by the master station, that is, so that a particular secondary station is selected more frequently by the master station, the particular secondary station provides improved response and throughput.

According to a ninth aspect, in the third aspect, the master station generates a down-link signal including a certain command and sends out the down-link signal onto the down-link channel, and the secondary stations execute processing corresponding to the certain command included in the down-link signal inputted from the down-link channel.

In accordance with the ninth aspect, the down-link signal for signaling free channels assigned to selected secondary stations also contains a certain command. The secondary stations perform processing corresponding to the certain command contained in the down-link signal inputted from the down-link channel. This improves the expandability of the access control in the communication system.

A tenth aspect is directed to a method for controlling access from secondary stations to a master station in a communication system in which the master station and a plurality of secondary stations can bi-directionally communicate, wherein the plurality of secondary stations are divided into a plurality of groups, the master station can use a down-link channel to transfer a down-link signal, and each secondary station belonging to each group can use a plurality of up-link channels assigned to each group to transfer up-link signals, wherein the master station detects currently unused one(s) of the up-link channels (hereinafter referred to as "free channels"), selects one(s) of the secondary stations of a number corresponding to the detected free channel(s) from the secondary stations belonging to the group to which the free channel(s) is/are assigned, assigns each detected free channel to each selected secondary station, and generates a down-link signal for signaling the assigned free channel(s) to the selected secondary station(s) and sends the down-link signal onto the down-link channel, and the secondary stations determine whether any of the up-link channels are assigned to these stations on the basis of the down-link signal inputted from the down-link channel.

Various data, such as computer data, audio data, etc., are communicated between the master station and the secondary stations. However, in general, while the audio data is generated, to some degree, in a fixed amount, the computer data is generated in various amounts. Furthermore, audio data loses its meaning as audio data if response and throughput are not ensured. Accordingly, according to the tenth aspect, the secondary stations connected to the master station are divided into a plurality of groups and the up-link channels are assigned group by group. When detecting a free channel, the master station selects a secondary station to assign the free channel from among the secondary stations belonging to the group to which the detected free channel is assigned. If, for example, secondary stations communicating of audio data requiring ensured response and throughput are grouped, the up-link channels can be periodically assigned to the secondary stations belonging to that group. This ensures the response and throughput at least of the secondary stations in this group.

An eleventh aspect of the present invention is directed to a method for controlling access from secondary stations to a master station in a communication system in which the master station and a plurality of secondary stations can bi-directionally communicate, wherein the master station can use a down-link channel to transfer a down-link signal and each secondary station can use a plurality of up-link channels to transfer up-link signals, wherein the master station detects an up-link channel which is currently not used (hereinafter referred to as "a free channel"), and generates a down-link signal for signaling the detected free channel to the secondary stations and sends out the down-link signal onto the down-link channel, and the secondary stations recognize the up-link channel which is currently free from the down-link signal inputted from the down-link channel and send out the up-link signal onto the free channel.

In accordance with the eleventh aspect, the master station signals the information of a detected free channel at once to the secondary stations, which prevents the traffic on the up-link channels from being congested. Furthermore, even if the traffic is congested on another up-link channel, it affects all secondary stations in a dispersed manner, since the secondary stations send out up-link signals by using free channels detected by the master station. This improves the response and throughput of all secondary stations accommodated in the communication system.

According to a twelfth aspect, in the eleventh aspect, when an error is occurring in an up-link signal inputted from an up-link channel, the master station generates a down-link signal including a data error command indicative of the occurrence of an error and sends it out onto the down-link channel, and the secondary station which is sending out the up-link signal suspends the sending out of the up-link signal on the basis of the data error command.

In accordance with the twelfth aspect, the secondary stations suspend sending out of data in response to the data error command included in a down-link signal inputted from the down-link channel. Since the master station thus causes the secondary stations to suspend invalid sending out of the up-link signal at the time when the data is errored on the up-link channel, the response and throughput is improved on the up-link channel.

According to a thirteenth aspect, in the eleventh aspect, the master station is detecting the level of a received signal on each up-link channel, and when the level of the received signal has reached or exceeded a certain level on any of the up-link channels, the master station generates a down-link signal including a receive command for signaling that the up-link signal has been received to the secondary station sending out the up-link signal onto that up-link channel, wherein each secondary station continues to send out the up-link signal on the basis of the receive command.

In accordance with the thirteenth aspect, the secondary stations can monitor whether a problem is occurring in the up-link signals which they sent out onto the up-link channels on the basis of the receive command. This removes invalid signal sending out and improves the throughput and response in the communication system.

According to a fourteenth aspect, in the thirteenth aspect, the secondary stations suspend sending out of up-link signals when they can not recognize the receive command in the down-link signal inputted from the down-link channel.

In accordance with the fourteenth aspect, when a secondary station sent out an up-link signal but finds no receive command in the following down-link signal, the secondary station recognizes occurrence of a problem in the up-link signal on the up-link channel and suspends the transfer of the up-link signal. Since the secondary station suspends the invalid up-link signal transfer at the time when a trouble occurs on the up-link channel, the throughput and the response in the communication system are improved.

According to a fifteenth aspect, in the eleventh aspect, the master station is detecting the level of a received signal on each up-link channel, and when the level of the received signal is lower than a certain level on any of the up-link channels, the master station recognizes that up-link channel as a free channel, and generates a down-link signal including a transmission enabling command for signaling the free channel to each secondary station and sends out the down-link signal onto the down-link channel, wherein each secondary station sends out an up-link signal onto the free channel on the basis of the transmission enabling command.

In accordance with the fifteenth aspect, when the received signal level on an up-link channel is lower than a certain level, the master station signals that the up-link channel is a free channel by using a transmission enabling command. In other words, when a signal received on an up-link channel is at the certain level or higher, the master station recognizes that the up-link channel is used for communication or is suffering a trouble due to noise and does not signal that up-link channel as a free channel to the secondary stations. This prevents the secondary stations from transferring invalid up-link signals, thus improving the throughput and response in the communication system.

According to a sixteenth aspect, in the fifteenth aspect, when the down-link signal includes a plurality of transmission enabling commands, each secondary station, when holding data to send out to the master station, determines that there are a plurality of free channels, selects one free channel from among the plurality of free channels at random, and sends out the up-link signal onto the selected up-link channel.

In accordance with the sixteenth aspect, each secondary station can select one free channel from among a plurality of free channels at random to send out an up-link signal, which improves the throughput and response in the communication system.

According to a seventeenth aspect, in the eleventh aspect, each secondary station sends out the up-link signal onto the up-link channel with a synchronization pattern set in a certain position in the up-link signal, and when not detecting the synchronization pattern from the up-link signal inputted from the up-link channel, the master station generates a down-link signal including a collision detection command for signaling an occurrence of a communication collision on the up-link channel and sends out the down-link signal onto the down-link channel, wherein the secondary station which transferred the up-link signal suspends the transfer of the up-link signal on the basis of the collision detection command.

In accordance with the seventeenth aspect, the master station can recognize ahead of an up-link signal transmitted on an up-link channel on the basis of a change of the received signal level, and it can also estimate the position in which a synchronization pattern is set in the up-link signal. When it detects no synchronization pattern, the received signal can be regarded as an up-link signal whose synchronization pattern was broken by a communication collision on the up-link channel. In this case, the master station signals the occurrence of a communication collision on the up-link channel by using a down-link signal to the secondary station which sent out the up-link signal. This secondary station suspends the transfer of the up-link signal in response to the communication collision command included in the down-link signal. The master station thus causes the secondary station to suspend an invalid transmission of up-link signal at the time when a communication collision occurs on the up-link channel, thereby improving the throughput and response in the communication system.

According to eighteenth, nineteenth and twentieth aspects, in the twelfth, fourteenth and seventeenth aspects, when having a suspended transfer of the up-link signal, each secondary station retransmits the up-link signal.

In accordance with the eighteenth to twentieth aspects, when having recognized an invalid up-link signal transmission, the secondary station can immediately retransmit the data. This further improves the throughput in the communication system.

A twenty-first aspect is directed to a method for controlling access from secondary stations to a master station in a communication system in which the master station and a plurality of secondary stations can bi-directionally communicate, wherein the master station can use a down-link channel to transfer a down-link signal and each secondary station can use a plurality of up-link channels to transfer up-link signals, wherein the master station is detecting the condition of use of each up-link channel, and determines on the basis of the condition of use whether to assign an up-link channel which is currently not used (hereinafter referred to as "a free channel") to one of the secondary stations or to signal the free channel to each secondary station, wherein when having determined to assign the free channel to one of the secondary stations, the master station generates a down-link signal for assigning the free channel to the secondary station and sends out the down-link signal onto the down-link channel, and when having determined to signal the free channel to each secondary station, the master station generates a down-link signal for signaling the free channel to each secondary station and sends out the down-link signal onto the down-link channel.

Generally, it improves the throughput and response in a communication system to assign a free channel to a particular secondary station when the up-link channels are crowded. When the up-link channels are not crowded, however, allowing the secondary stations to freely send out up-link signals onto free channels improves the throughput and response. Accordingly, in the twenty-first aspect, the master station monitors the conditions of use of the up-link channels and determines, on the basis of the conditions of use, whether to assign free channels to particular secondary stations or to allow the secondary stations to freely send out up-link signals onto free channels. Then the master station can control accesses from the secondary stations so as to always keep high throughput and response.

A twenty-second aspect is directed to a method for controlling access from secondary stations to a master station in a communication system in which the master station and a plurality of secondary stations can bi-directionally communicate, wherein the master station can use a down-link channel to transfer a down-link signal and each secondary station can use a plurality of up-link channels to transfer up-link signals, wherein the master station counts the number of up-link channels which are currently not used (hereinafter referred to as "the number of free channels") and the number of up-link channels currently carrying up-link signals and suffering a communication collision (hereinafter referred to as "the number of communication collision channels"), wherein when the number of communication collision channels has reached or exceeded a first certain number, the master station detects up-link channels which are currently not used (hereinafter referred to as "free channels") and assigns the free channels to the secondary stations, and generates a down-link signal for signaling the free channels assigned to the secondary stations and sends out the down-link signal onto the down-link channel, and when the number of free channels has reached or exceeded a second certain number, the master station detects free channels and generates a down-link signal for signaling the detected free channels to each secondary station and sends out the down-link signal onto the down-link channel.

In accordance with the twenty-second aspect, the master station counts the number of free channels and the number of communication collision channels and determines whether to assign free channels to particular secondary stations on the basis of the number of the communication collisions and determines whether to allow the secondary stations to freely send out up-link signals onto free channels on the basis of the number of free channels. Then the master station can control accesses from the secondary stations so as to always keep the throughput and response high.

According to a twenty-third aspect, in the twenty-second aspect, when the number of communication collision channels has reached or exceeded the first certain number, the master station detects free channel(s) and selects one(s) of the secondary stations of a number corresponding to the detected free channel(s), and individually assigns the free channel(s) to the selected secondary station(s).

In accordance with the twenty-third aspect, the master station selects a secondary station every time a free channel occurs and individually assigns the free channel to the selected secondary station. Even if a certain secondary station makes a communication by using a certain up-link channel in a long time, the master station can, when another up-link channel becomes free, assign the up-link channel to another secondary station. The up-link channels are then always being assigned to some of the secondary stations. Then, if traffic is congested on an up-link channel, it affects not only a particular certain secondary station but also affects all secondary stations in a dispersed manner. This improves the response and throughput of all the secondary stations accommodated in the communication system.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing an example of the address table 111 shown in FIG. 2.

FIG. 13 is a diagram showing another example of the address table 111 shown in FIG. 2.

FIG. 14 is a diagram showing an example of the address table in a communication system to which an access control method of a third embodiment of the invention is applied.

FIG. 15 is a flow chart showing the operating procedure in which the down-link frame generating/transferring portion 12 generates a down-link frame in a communication system to which the access control method of the third embodiment of the invention is applied.

DESCRIPTION OF THE PREFERRED EMBODIMENTS

Figure 1:
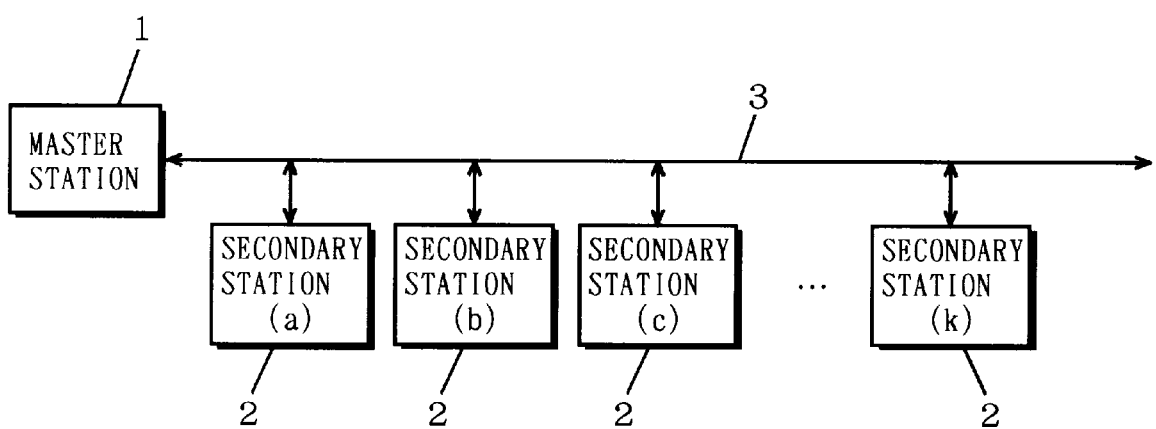
FIG. 1 is a block diagram showing the entire structure of a communication system to which an access control method of a first embodiment of the present invention is applied.

FIG. 1 is a block diagram showing the entire structure of a communication system to which an access control method according to a first embodiment of the present invention is applied. In FIG. 1, a master station 1 and 11 secondary stations 2 (shown are four) are connected to the communication system through the transmission path 3. This transmission path 3 includes a down-link channel through which the master station 1 transfers down-link frames and five up-link channels $ch_1$–$ch_5$ through which the secondary stations 2 transfer up-link frames. Separated frequency bands are individually assigned to the five up-link channels. That is to say, this communication system uses the frequency division multiplex system. The secondary stations 2 have their respective secondary station addresses ("a" to "k") previously assigned in such a way that they do not overlap. The secondary station to which a secondary station address "a" is assigned is indicated as a secondary station 2a hereinafter. Other secondary stations 2 are called secondary stations 2b to 2k as well.

Figure 2:
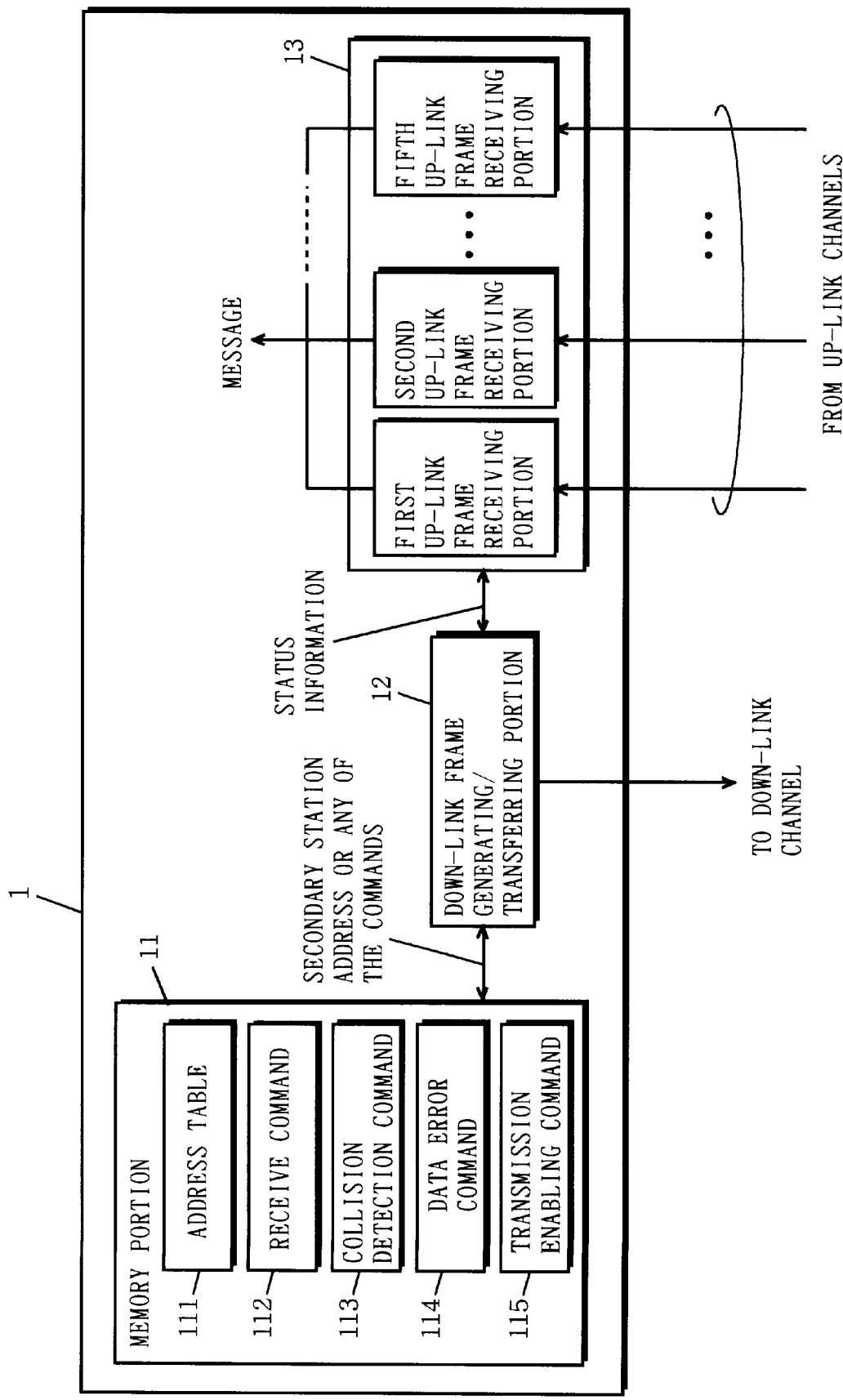
FIG. 2 is a block diagram showing the details of the structure of the master station 1 shown in FIG. 1.

FIG. 2 is a block diagram showing the structure of the master station 1 shown in FIG. 1. In FIG. 2, the master station 1 includes a memory portion 11, a down-link frame generating/transferring portion 12 and an up-link frame receiving portion 13.

The memory portion 11 contains an address table 111, a receive command 112, a collision detection command 113, a data error command 114 and a transmission enabling command 115 in certain address areas.

The address table 111 will be explained first. In this communication system, the order of assigning free channels (described later) to the secondary stations is determined in advance. The address table 111 contains the order associated with the secondary station addresses. More specifically, as shown in FIG. 3, the secondary station addresses "a" to "k" ordered from "1" to "11" are stored in the address table 111. The above-mentioned four commands, the receive command 112, the collision detection command 113, the data error command 114 and the transmission enabling command 115 will be explained later.

The down-link frame generating/transferring portion 12 generates down-link frames and sends out the down-link frames onto the down-link channel. The procedure of generating the down-link frames will be explained later referring to FIG. 8, FIG. 9 and FIG. 11.

Figure 4:
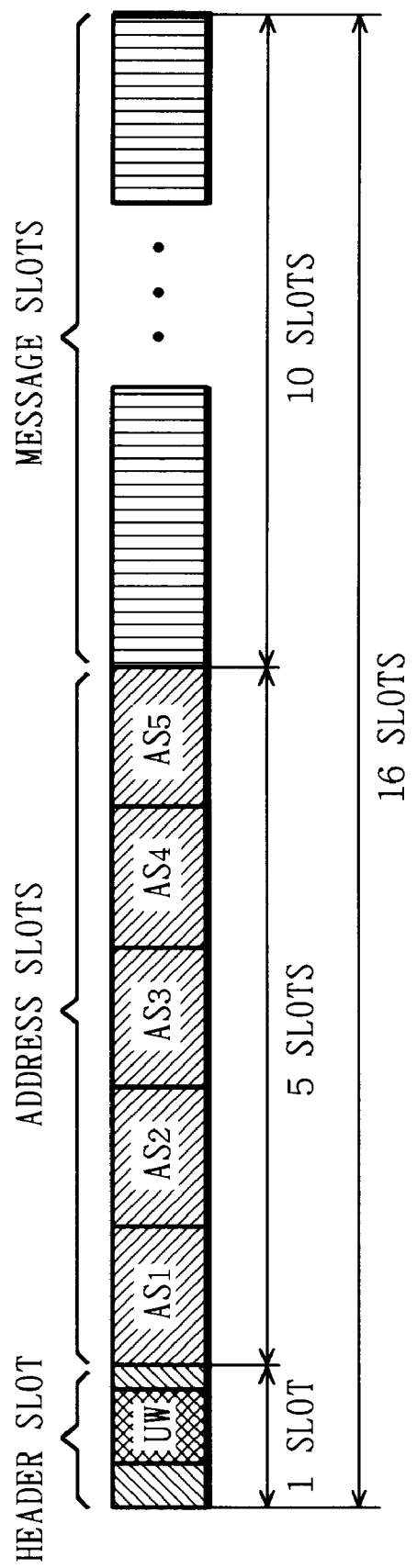
FIG. 4 is a diagram showing the configuration of a down-link frame sent out from the master station 1 shown in FIG. 2.

FIG. 4 is a diagram showing the configuration of a down-link frame. In FIG. 4, one down-link frame is formed of 16 slots (32 bits/slot), including a header slot, five address slots $AS_1$–$AS_5$ and message slots.

The header slot contains a preamble, a synchronization pattern (shown in FIG. 4 as "UW" (Unique Word)) and so on. The synchronization pattern UW has a certain bit pattern, which is used to establish various kinds of synchronizations.

One secondary station address or one command is set in each of the address slots $AS_1$ to $AS_5$. In this communication system, the address slots $AS_1$ to $AS_5$ correspond to the up-link channels $ch_1$ to $ch_5$. For example, setting the secondary station address "a" in the address slot $AS_1$ indicates that the master station 1 assigns the up-link channel $ch_1$ to the secondary station 2a.

Messages from the master station 1 to the secondary stations 2 are stored in the message slots. This enables communication of data from the master station 1 to the secondary stations 2. The message slots will not be explained herein because they are not related to the invention.

The preamble, the synchronization pattern UW, the address slots $AS_1$–$AS_5$ and the message slots are set in predetermined bit positions in a down-link frame, as shown in FIG. 4.

Figure 5A:
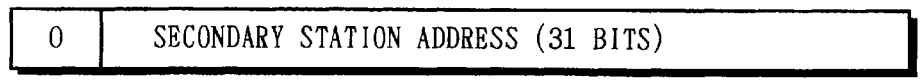
FIGS. 5(a) and (b) are diagrams showing bit configurations of a secondary station address and various commands set in the address slots shown in FIG. 4.

FIG. 5 is a diagram showing the bit configurations of a secondary station address and various commands. FIG. 5(a) shows the bit configuration of a secondary station address. As has been stated above, the secondary station addresses "a" to "k" are assigned to the secondary stations 2 in an unoverlapping manner. However, since a large number of secondary stations 2 are accommodated in an actual communication system, actual secondary station addresses are each represented in a 32-bit binary number, as shown in FIG. 5(a). Actual secondary addresses are set to "0" in the leading 1 bit and are formed by using the remaining 31 bits in an unoverlapping manner.

Figure 5B:
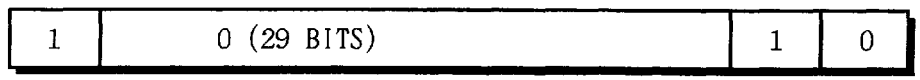

FIG. 5(b) shows the bit configuration of various commands. These commands are all represented in 32-bit binary numbers, as shown in FIG. 5(b), wherein the leading 1 bit is set to "1", and the last 2 bits are set to "1" and "0". The remaining 29 bits in the individual commands have different bit patterns from each other. That is to say, the receive command 112, the collision detection command 113, the data error command 114 and the transmission enabling command 115 have different bit configurations from one another.

Now, referring to FIG. 2 again, the up-link frame receiving portion 13 includes first to fifth up-link frame receiving portions 131 to 135 corresponding to the number of the up-link channels (three of them are shown in the diagram). The first to fifth up-link frame receiving portions 131 to 135 apply the following processings to up-link frames transmitted on the up-link channels $ch_1$–$ch_5$. The processing in the first up-link frame receiving portion 131 is now explained. The second to fifth up-link frame receiving portions 132 to 135 perform the same processing as the first up-link frame 131.

First, the first up-link frame receiving portion 131 monitors whether an up-link frame is transmitted on the up-link channel $ch_1$ by using an internal comparator (not shown) for a first certain time after a down-link frame was sent out. The first certain time is determined considering, for example, the delay time which an up-link frame from a secondary station requires to reach the master station.

The comparator compares the level of a reference signal and the level of the received signal from the up-link channel $ch_1$. This reference signal has a predetermined certain level. When detecting that the received signal level has changed from under the certain level to the certain level or higher, the comparator outputs a first comparison output. That is to say, the first comparison output serves as information indicating that the first up-link frame receiving portion 131 has detected a head of an up-link frame. When the first certain time has passed without a head of an up-link frame detected, the comparator outputs a second comparison output if it has detected that the received signal is at the level of the reference signal or higher. If, at that time, it has detected that the received signal level is lower than the reference signal level, it outputs a third comparison output. The second comparison output is information indicating that up-link frames are being continuously sent out onto the up-link channel $ch_1$. The third comparison output is information indicating that the up-link channel $ch_1$ is free. The first up-link frame receiving portion 131 thus monitors whether an up-link frame is transferred on the up-link channel $ch_1$.

When detecting a head of an up-link frame, the first up-link frame receiving portion 131 performs detection of the synchronization pattern UW. The detection of the synchronization pattern UW is performed in a second certain time after the head of the up-link frame was detected. The second certain time is determined considering the distance on the up-link frame from the head to the bit position in which a synchronization pattern UW is estimated to be stored. When detecting a synchronization pattern UW within the second certain time, the first up-link frame receiving portion 131 outputs first receive information (UW detected) indicating the detection. When detecting none, it outputs first receive information (UW undetected) indicting the fact when the second certain time has passed.

When having determined that up-link frames are being continuously sent out, the first up-link frame receiving portion 131 applies the known technique, FCS (Frame Check Sequence) to each frame. If it determines that each up-link frame is being correctly transmitted on the up-link channel $ch_1$ without data error, it outputs second receive information (valid) indicating the fact. On the other hand, if it has determined that a data error is occurring in the up-link frame, the first up-link frame receiving portion 131 outputs second receive information (error) indicative of it.

The first up-link frame receiving portion 131 also performs other processings, such as taking out a message from an up-link frame, but they are not related to the invention and therefore not explained herein.

Figure 6:
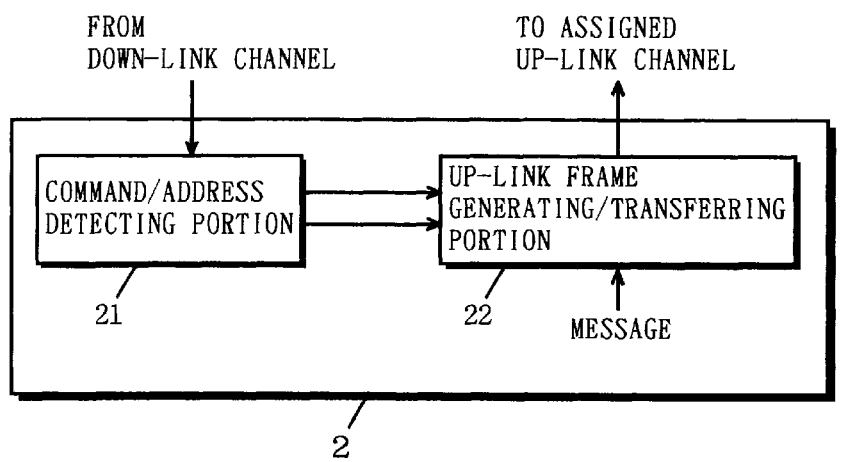
FIG. 6 is a block diagram showing the details of the structure of the secondary station 2 shown in FIG. 1.

FIG. 6 is a block diagram showing the detailed structure of a secondary station 2 (refer to FIG. 1). In FIG. 6, a secondary station 2 includes a command/address detecting portion 21 and an up-link frame generating/transferring portion 22. When a secondary station 2 is signaled from the master station 1 that it can send out up-link frames through a free channel, it sends out up-link frames by using the free channel. Operation of the command/address detecting portion 21 will be explained later referring to FIG. 10.

The procedure in which the up-link frame generating/transferring portion 22 generates an up-link frame will be briefly described. A secondary station 2 generates transmission data, such as video data or audio data, for example. The transmission data is stored in a buffer memory (not shown) included in the secondary station 2. The up-link frame generating/transferring portion 22 divides the transmission data in the buffer memory by every 120 bits. Then it generates an up-link frame by adding a 8-bit header to the transmission data corresponding to the first 120 bits (refer to FIG. 7(*a*)) and it generates up-link frames by adding a 8-bit FCS to the following transmission data (refer to FIG. 7(*b*)).

Figure 8:
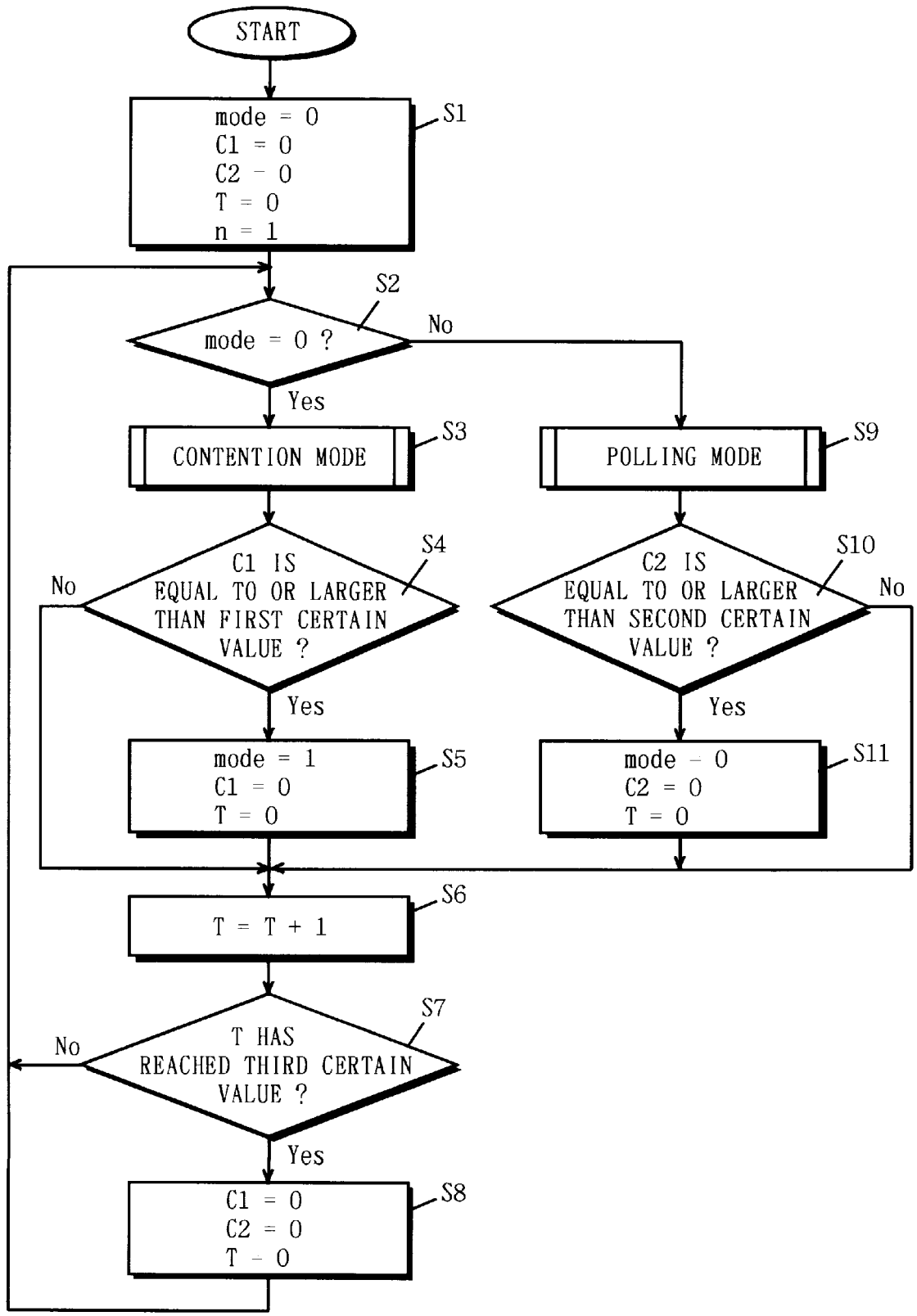
FIG. 8 is a flow chart showing the operating procedure of the master station 1 shown in FIG. 1.

In the communication system explained above, the master station 1 controls accesses from the secondary stations 2 by using the down-link frames. FIG. 8 is a flow chart showing the operating procedure in which the frame generating/transferring portion 12 generates a down-link frame.

In an initial state, no up-link frame is transferred on any of the up-link channels $ch_1$–$ch_5$. In this state, the first to fifth up-link frame receiving portions 131–135 output only the third comparison outputs without performing detection of the synchronization pattern UW and the FCS. The first to fifth up-link frame receiving portions 131–135 output the comparison outputs and the like to the down-link frame generating/transferring portion 12 at certain timings. The certain timings will be explained later. A combination of the comparison output, the first receive information and the second receive information is referred to as status information hereinafter.

The down-link frame generating/transferring portion 12 generates a first down-link frame under these circumstance. The down-link frame generating/transferring portion 12 includes a mode flag α, counters C1, C2 and T, a slot pointer m and an address pointer n (not shown). The mode flag α and the counters C1, C2 and T are set to "0" and the address pointer n is set to "1" (FIG. 8; Step S1).

The down-link frame generating/transferring portion 12 refers to the mode flag α to determine whether to move to a contention mode (Step S3 explained later) or to a polling mode (Step S9 explained later), which takes a value of "0" or "1". The counter C1 counts the number of up-link channels on which a communication collision takes place and the counter C2 counts the number of free channels. A free channel means an up-link channel on which no up-link frame is being transferred (no data communication is being made). The counter T measures a time period for counting the number of communication collisions and the number of free channels. The address pointer n indicates "nth" one in the order in the address table 111, explained above, to specify a secondary station address to be set in an address slot AS. Accordingly, the address pointer n counts up one by one from "1" to "11" in this communication system. The slot pointer m will be explained later when required.

Next, the down-link frame generating/transferring portion 12 determines whether the mode flag α is indicating "0" or not (Step S2). If it is indicating "0", the down-link frame generating/transferring portion 12 determines that it is better to generate a down-link frame in the contention mode and moves to Step S3. On the other hand, if the mode flag α is not indicating "0" (indicating "1"), the down-link frame generating/transferring portion 12 determines that it is better to generate a down-link frame in the polling mode and moves to Step S9 explained later. At present, as is clear from the description above, the down-link frame generating/transferring portion 12 moves to Step S3.

The difference between the contention mode and the polling mode will now be briefly explained. In the contention mode, a plurality of secondary stations 2 can send out up-link frames onto one free channel. Therefore it is more prone to communication collision than the polling mode. However, the contention mode, allowing the secondary stations 2 to freely send out up-link frames onto free channels, generally provides higher response than the polling mode.

On the other hand, in the polling mode, the master station 1 assigns one free channel to one secondary station 2 irrespective of whether it has transmission data. Accordingly, it provides lower response than the contention mode. However, the polling mode in which, as a rule, a plurality of secondary stations 2 do not send out up-link frames onto a single up-link channel is less prone to communication collisions than the contention mode.

However, it is thought that generating down-link frames in the contention mode when a relatively larger number of channels are free will cause fewer communication collisions and provide higher response. Accordingly, in the initial state in which all up-link channels are free, it is preferred that the mode flag α is set to "0" so that the down-link frame is generated in the contention mode. On the other hand, when a relatively smaller number of channels are free, the polling mode which is less prone to communication collisions will provide higher response than the contention mode.

Figure 9:
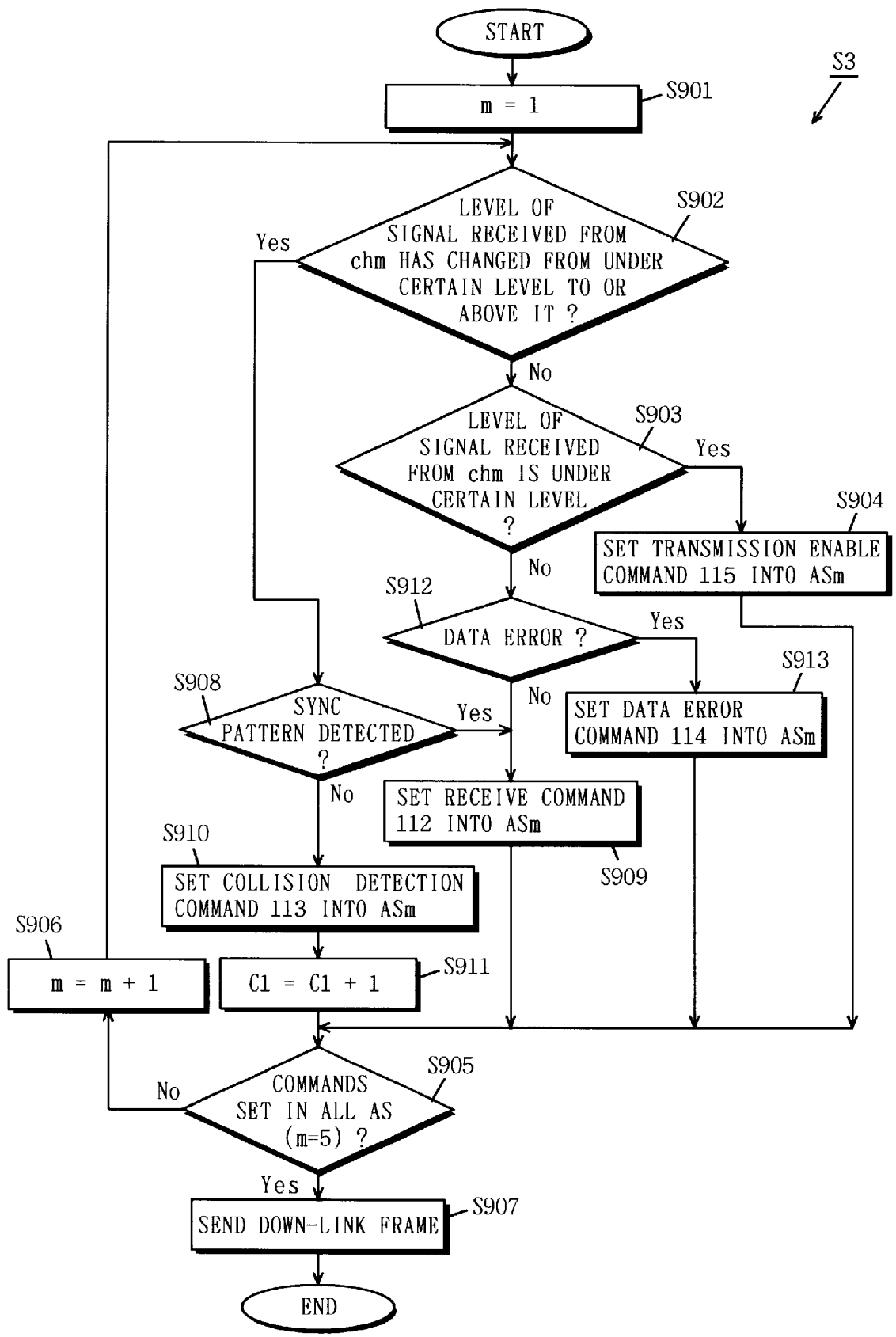
FIG. 9 is a flow chart showing the details of the operating procedure in Step S3 shown in FIG. 8.

FIG. 9 is a flow chart showing details of the processing procedure in Step S3 (the contention mode) shown in FIG. 8. First, the down-link frame generating/transferring portion 12 sets the slot pointer m to "1" (FIG. 9; Step S901). The slot pointer m specifies an address slot AS in which a secondary station address or the above-explained commands are to be set. Since there are five address slots in this communication system, the slot pointer m counts up one by one from "1" to "5".

The timing is controlled between the down-link frame generating/transferring portion 12 and the up-link frame receiving portion 13 so that the status information is fed to the down-link frame generating/transferring portion 12 from an mth up-link frame receiving portion 13m (this "m" corresponds to the indicated value of the slot pointer m). Since the slot pointer m is currently indicating "1", the status information is inputted from the first up-link frame receiving portion 131.

Next, the down-link frame generating/transferring portion 12 determines whether the level of a received signal from an up-link channel specified by the slot pointer m (hereinafter referred to as "an up-link channel $ch_m$") has varied from under the certain level to the certain level or higher (Step S902). If the status information includes the first comparison output, the down-link frame generating/transferring portion 12 determines that the level of the received signal has changed and moves to Step S908 explained later. If the status information does not include the first comparison output, it determines that the level has not changed and moves to Step S903. At present, since the down-link frame generating/transferring portion 12 is receiving the third comparison output from the first up-link frame receiving portion 131 as stated above, it moves to Step S903.

Next, the down-link frame generating/transferring portion 12 determines whether the level of the received signal from the up-link channel $ch_m$ is lower than the fixed level (Step S903). When the status information includes the second comparison output, the down-link frame generating/transferring portion 12 determines that the level of the received signal is at the certain level or higher and moves to Step S912 explained later. When the status information includes the third comparison output, it determines that the level is lower than the certain level and moves to Step S904. At present, the down-link frame generating/transferring portion 12, receiving the third comparison output, moves to Step S904.

Next, the down-link frame generating/transferring portion 12 accesses the memory portion 11 to extract the transmission enabling command 115 and then sets the transmission enabling command 115 into an address slot AS specified by the slot pointer m (hereinafter referred to as "an address slot $AS_m$," Step S904). The master station 1 thus signals to each secondary station 2 that the up-link channel $ch_m$ is free. At present, the slot pointer m indicates "1" and the transmission enabling command 115 is set into the address slot $AS_1$.

Next, the down-link frame generating/transferring portion 12 determines whether some commands have been set in all address slots AS (Step S905). When having determined that commands have been set in all address slots AS, the down-link frame generating/transferring portion 12 moves to Step S907 described later. On the other hand, when having determined that commands have not been set into all address slots AS, the down-link frame generating/transferring portion 12 moves to Step S906. Since there are five address slots in this communication system, the determination in Step S905 is made depending on whether the slot pointer m indicates "5". At present, the slot pointer m is indicating "1" and therefore the down-link frame generating/transferring portion 12 moves to Step S906.

Next, the down-link frame generating/transferring portion 12 updates the slot pointer m to "m+1" (Step S906) and returns to Step S902 to determine a command to be set into the next address slot AS. At present, the slot pointer m is updated from "1" to "2."

The timing is controlled so that the status information is, at this time, being inputted to the down-link frame generating/transferring portion 12 from an mth up-link frame receiving portion 13m indicated by the value of the slot pointer m after updated. At present, the status information outputted from the second up-link frame receiving portion 132 is inputted.

In the initial state, all up-link channels are free. Accordingly, the down-link frame generating/transferring portion 12 repeats the processing procedure shown in the order of Steps S902–S906 three times and then executes the processing procedure shown in the order of Steps S902–S905. As the result, the transmission enabling commands 115 are set into the address slots $AS_2$–$AS_5$ as well. When having executed Step S905 with the slot pointer m indicating "5", the down-link frame generating/transferring portion 12 moves to Step S907.

Next, the down-link frame generating/transferring portion 12 sets the preamble and the synchronization pattern UW into the header slot and messages into the message slots, if needed, to assemble a down-link frame (refer to FIG. 4) and sends out this down-link frame onto the down-link channel (Step S907) to end Step S3 in FIG. 8. Operations of the secondary stations 2 receiving this down-link frame will be explained later.

Referring to FIG. 8 again. Next, having finished Step S3, the down-link frame generating/transferring portion 12 determines whether the counter C1 indicates a value equal to or higher than a first certain value (Step S4). The first certain value is a value for determining whether the mode flag α should be updated from "0" to "1". Considering the characteristics of the contention mode and the polling mode, this value is set to an appropriate value corresponding to the specifications of the communication system. The first certain value is assumed to be "3" hereinafter.

When the counter C1 indicates a value not less than the first certain value in Step S4, the down-link frame generating/transferring portion 12 determines that it is suitable to generate a down-link frame in the polling mode and moves to Step S5 described later. On the other hand, if the counter C1 is indicating a value smaller than the first certain value, the down-link frame generating/transferring portion 12 determines that it should generate a down-link frame in the contention mode and moves to step S6. At present, the indication value "0" of the counter C1 is smaller than the first certain value "3" and therefore the down-link frame generating/transferring portion 12 moves to Step S6.

Next, the down-link frame generating/transferring portion 12 updates the indicated value of the counter T to "T+1" (Step S6) and determines whether the indicated value of the counter T has reached a third certain value (Step S7). When determining that the indication value of the counter T has reached the third certain value, the down-link frame generating/transferring portion 12 moves to Step S8 explained later. When determining that the indication value of the counter T has not reached the third certain value, the down-link frame generating/transferring portion 12 returns to Step S2. The third certain value is a value for defining an end of the time period in which the down-link frame generating/transferring portion 12 measures the number of communication collisions and the number of free channels. That is to say, in this communication system, the number of communication collisions or the number of free channels per period while the counter T counts from "0" to "the third certain value" are measured. The third certain value is assumed to be "3" hereinafter. At present, the down-link frame generating/transferring portion 12 updates the counter T from "0" to "1" (Step S6) and then returns to Step S2 since the indication value of the counter T has not reached the third certain value "3" (Step S7).

Figure 10:
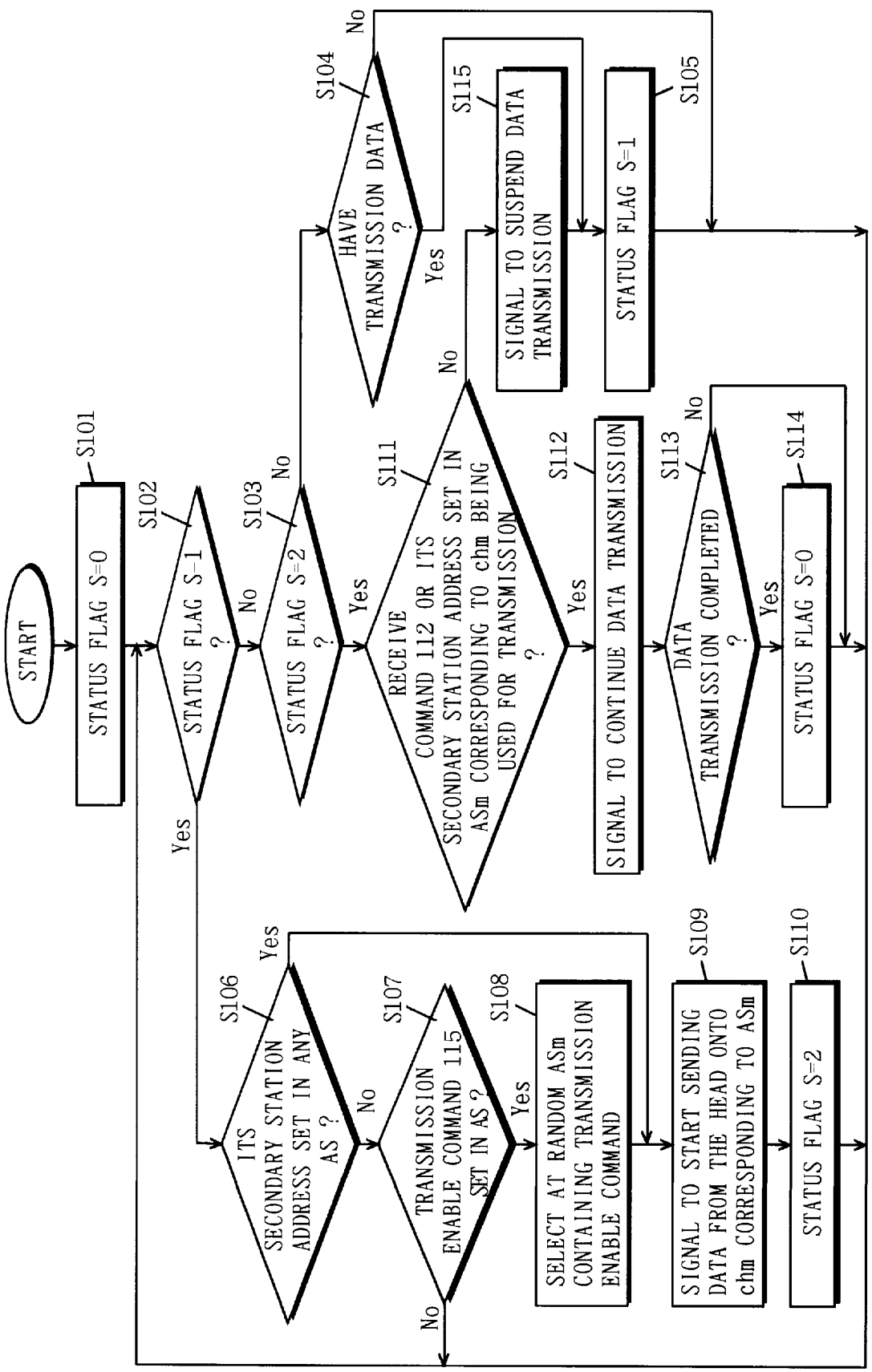
FIG. 10 is a flow chart showing the operating procedure of the secondary stations 2 shown in FIG. 1.

Part of the operations of the secondary stations 2 in this communication system will now be described referring to the flow chart showing the operating procedures of the secondary stations 2 in FIG. 10. The command/address detecting portion 21 of each secondary station 2 includes a status flag S indicating "0", or "1", or "2". The status flag S is set to "0" when this system is started (Step S101). When the status flag S is indicating "0" in a certain secondary station 2, it means that the secondary station 2 has no transmission data to the master station 1. If the status flag S is indicating "1" in a secondary station 2, it means that the secondary station 2 has transmission data to the master station 1 and that the data must be transferred from the head. Furthermore, if the status flag S indicates "2" in a secondary station 2, it means that the secondary station 2 is being transmitting transmission data to the master station 1.

Next, the command/address detecting portion 21 determines whether the status flag S is indicating "1" (Step S102). If it is indicating "1", it moves to Step S106 explained later and if it is indicating a value other than "1," it moves to Step S103.

Next, each command/address detecting portion 21 determines whether the status flag S is indicating "2" (Step S103).

If it is indicating "2", it moves to Step S111 explained later and if it is indicating a value other than "2" (that is, indicating "0"), it moves to Step S104. At present, the status flags S are indicating "0" in all of the secondary stations 2 and therefore all command/address detecting portions 21 execute Steps S102 and S103 and move to Step S104.

Next, each command/address detecting portion 21 determines whether each secondary station 2 has data to be transmitted to the master station 1 (Step S104). As stated above, the secondary stations 2 each generate transmission data and store the data into a buffer memory. The determination in Step S104 is made by detecting whether transmission data is stored in the buffer memory. When the buffer memory contains no transmission data, each command/address detecting portion 21 returns to Step S102. That is to say, the secondary station 2 waits until transmission data is generated with the status flag S set at "0." When transmission data is stored in the buffer memory, the command/address detecting portion 21 moves to Step S105 to set the status flag S to "1" and returns to Step S102. Thus, when transmission data is generated, each secondary station 2 waits for a down-link frame to be transmitted with the status flag S set at "1".

The down-link frame of this time is received at the command/address detecting portions 21 of all secondary stations 2. At present, the status flag S in each secondary station 2 is indicating "0" or "1". The operation of a secondary station 2 whose status flag S is indicating "1" will now be described.

If the status flag S indicates "1" when the down-link frame is transferred from the down-link channel (Step S102), the command/address detecting portion 21 moves to Step S106.

Next, the command/address detecting portion 21 determines whether the secondary station address of this station 2 is set in any of the address slots AS (Step S106). As is clear from the description above, no secondary station addresses are set in a down-link frame generated in the contention mode (refer to FIG. 8; Step S3). The command/address detecting portion 21 hence moves to Step S107. Step S106 will be explained in detail later.

Next, the command/address detecting portion 21 detects whether the transmission enabling commands are set in the address slots AS in the down-link frame received this time (Step S107). The determination in Step S107 is typically made as follows. The command/address detecting portion 21 holds, in advance, the bit pattern of the transmission enabling command in a register included therein (not shown). The command/address detecting portion 21 compares the bit pattern and that set in the address slot $AS_1$ in the down-link frame to determine whether they coincide. If they coincide, it determines that the transmission enabling command is set in the address slot $AS_1$. Then the same processing is applied to the address slots $AS_2$–$AS_5$. When the transmission enabling command is set in an address slot $AS_m$, the command/address detecting portion 21 recognizes that the up-link channel $ch_m$ corresponding to the slot $AS_m$ is free. If the transmission enabling command is set in any of the address slots AS, the command/address detecting portion 21 moves to Step S108. Since transmission enabling commands are set in the address slots $AS_1$–$AS_5$ in this down-link frame, the command/address detecting portion 21 moves to Step S108.

When the transmission enabling command is stored in none of the address slots AS, the command/address detecting portion 21 determines that no channel is free and returns to Step S102, and waits for a new down-link frame to be transmitted.

Next, the command/address detecting portion 21 selects, at random, one address slot $AS_m$ from among the address slots AS containing transmission enabling commands (Step S108) and signals to the up-link frame generating/transferring portion 22 to send out an up-link frame by using the up-link channel $ch_m$ corresponding to that slot $AS_m$ (Step S109). Then the command/address detecting portion 21 latches, into a register (not shown), the address slot $AS_m$ selected in Step S108 as a used channel information. This used channel information is used in Step S111 described later.

Figure 7A:
FIGS. 7(a) and (b) are diagrams showing an example of configuration of the up-link frames sent out from the secondary stations shown in FIG. 6.

The up-link frame generating/transferring portion 22 generated an up-link frame as shown in FIG. 7(a) at the time when the status flag S has been set to "1", and it sends out the frame onto the up-link channel $ch_m$ specified by the command/address detecting portion 21.

Having finished the Step S109, the command/address detecting portion 21 changes the status flag S from "1" to "2" (Step S110) to indicate that the up-link frame generating/transferring portion 22 is transmitting up-link frames to the master station 1.

For more specific description, it is assumed that, in response to the first down-link frame, the secondary station 2a sends out an up-link frame onto the up-link channel $ch_1$, the secondary station 2b onto the up-link channel $ch_2$, the secondary station 2c and the secondary station 2d onto the up-link channel $ch_3$, and the secondary station 2f and the secondary station 2j onto the up-link channel $ch_4$. No up-link frame is sent out onto the up-link channel $ch_5$.

Under these circumstance, no communication collision occurs on the up-link channel $ch_1$ and the synchronization pattern UW in the up-link frame sent out from the secondary station 2a is not broken. Accordingly, the first up-link frame receiving portion 131 can detect the head of the up-link frame and the synchronization pattern UW and outputs the first comparison output and the first receive information (UW detected) as the status information. Since the up-link channel $ch_2$ is in the same condition as the up-link channel $ch_1$, the second up-link frame receiving portion 132 outputs the same status information as the first up-link frame receiving portion 131. On the up-link channel $ch_3$, a communication collision occurs and the synchronization patterns UW in the up-link frames sent out from the secondary station 2c and the secondary station 2d are broken. Then the third up-link frame receiving portion 133 can detect the heads of the up-link frames but can not detect the synchronization patterns UW, and then outputs the first comparison output and the first receive information (UW undetected) as the status information. Since the up-link channel $ch_4$ is in the same condition as the up-link channel $ch_3$, the fourth up-link frame receiving portion 134 outputs the same status information as the third up-link frame receiving portion 133. Since the up-link channel $ch_5$ is free, the fifth up-link frame receiving portion 135 outputs only the third comparison output as the status information.

Now, the down-link frame generating/transferring portion 12 has already returned to Step S2 shown in FIG. 8. Since the mode flag α is indicating "0", it moves to Step S3 as in the previous time. The down-link frame generating/transferring portion 12 is controlled in advance so that it performs Step S3 immediately after passage of a second certain period after sending out the previous down-link frame. Though the second certain time is, too, determined by considering the delay time and so on which an up-link frame requires to travel from a secondary station 2 to the master station 1, it differs from the first certain time.

Next, the down-link frame generating/transferring portion 12 sets the slot pointer m to "1" (FIG. 9; Step S901) and determines a command to be set this time into the address slot $AS_1$ on the basis of the status information from the first up-link frame receiving portion 131. Next, the down-link frame generating/transferring portion 12, currently receiving the first comparison output, executes Step S902 and moves to Step S908.

Next, the down-link frame generating/transferring portion 12 determines whether the synchronization pattern UW has been detected from the up-link frame on an up-link channel $ch_m$ (Step S908). The determination in Step S908 is made on the basis of the first receive information. Specifically, the down-link frame generating/transferring portion 12 determines that an mth up-link frame receiving portion 13m did not detect the synchronization pattern UW when receiving the first receive information (UW undetected) and moves to Step S910 described later. On the other hand, when receiving the first receive information (UW detected), the down-link frame generating/transferring portion 12 determines that the mth up-link frame receiving portion 13m has detected the synchronization pattern UW and moves to Step S909. At present, since the down-link frame generating/transferring portion 12 is receiving the first receive information (UW detected) from the first up-link frame receiving portion 131, it moves to Step S909.

Next, the down-link frame generating/transferring portion 12 accesses the memory portion 11 to extract the receive command 112 and sets the command 112 into the address slot $AS_m$ (Step S909). Thus the master station 1 can inform the secondary station 2 using the up-link channel $ch_m$ of the correct reception of the up-link frame. At present, the receive command 112 is set into the address slot $AS_1$ to signal the correct reception of the up-link frame to the secondary station 2a.

Next, the down-link frame generating/transferring portion 12 updates the indicated value of the slot pointer m from "1" to "2" (Steps S905, S906) and returns to Step S902. Then the down-link frame generating/transferring portion 12 determines a command to be set this time into the address slot $AS_2$ on the basis of the status information from the second up-link frame receiving portion 132. This status information includes the same contents as that from the first up-link frame receiving portion 131, so that the down-link frame generating/transferring portion 12 executes the processings (explained above) shown in the order of Steps S902→S908→S909→S905→S906. As the result, the receive command 112 is set also in the address slot $AS_2$ (Step S909) and the indication value of the slot pointer m is updated from "2" to "3" (Step S906). Then the down-link frame generating/transferring portion 12 returns to Step S902 to determine a command to be set this time into the address slot $AS_3$ on the basis of the status information from the third up-link frame receiving portion 133.

Since the down-link frame generating/transferring portion 12 is now receiving the first comparison output at present, it executes Step S902. Then the down-link frame generating/transferring portion 12 executes Step S908, since it is receiving the first receive information (UW undetected), and it moves to Step S910.

Next, the down-link frame generating/transferring portion 12 accesses the memory portion 11 to extract the collision detection command 113 and sets it into the address slot $AS_m$ (Step S910). Thus the master station 1 can signal to the secondary station 2 using the up-link channel $ch_m$ that the up-link frame is not validly received and urges the secondary station 2 to perform retransmission control (described later). At present, the collision detection command 113 is set into the address slot $AS_3$ to urge the secondary station 2c and the secondary station 2d to perform retransmission control.

Next, having determined that a communication collision is taking place on the up-link channel $ch_m$, the down-link frame generating/transferring portion 12 updates the counter C1 to "C1+1" (Step S911). At present, the indication value of the counter C1 is updated from "0" to "1".

Next, the down-link frame generating/transferring portion 12 updates the indication value of the slot pointer m, which is presently "3", to "4" (Steps S905, S906) and returns to Step S902. Then the down-link frame generating/transferring portion 12 determines a command to be set this time into the address slot $AS_4$ on the basis of the status information from the fourth up-link frame receiving portion 134. Since this status information has the same contents as that from the third up-link frame receiving portion 133, the down-link frame generating/transferring portion 12 executes the processings (explained above) shown in the order of Steps S902→S908→S910→S911→S905→S906. Consequently, the collision detection command 113 is set into the address slot $AS_4$ this time (Step S910), the indication value of the counter C1 is updated from "1" to "2" (Step S911) and the indication value of the slot pointer m is updated from "4" to "5" (Steps S905, S906). Then the down-link frame generating/transferring portion 12 returns to Step S902 and determines a command to be set this time into the address slot $AS_5$ on the basis of the status information from the fifth up-link frame receiving portion 135.

Since this status information has the same contents as those from the first up-link frame receiving portion 131 and the like which the down-link frame generating/transferring portion 12 referred to when forming the previous down-link frame, the down-link frame generating/transferring portion 12 executes the processings (explained above) shown in the order of Steps S902→S903→S904→S905. Consequently, the transmission enabling command 115 is set into the address slot $AS_5$ this time (Step S904). Since the slot pointer m is currently indicating "5" (Step S905), the down-link frame generating/transferring portion 12 assembles a down-link frame, by setting the synchronization pattern UW and the like into the header slot and performing other processings, and sends out this down-link frame onto the down-link channel (Step S907). Thus the down-link frame generating/transferring portion 12 ends the processing in Step S3 in FIG. 8 and moves to Step S4. Operations of each secondary station 2 receiving the second down-link frame will be explained later.

Next, since the counter C1 is presently indicating "2", smaller than the first certain value "3" (Step S4), the down-link frame generating/transferring portion 12 updates the indication value of the counter T from "1" to "2" (Step S6) and then returns to Step S2, for the indication value "2" has not reached to the third certain value "3" (Step S7).

Now, operation of the secondary station 2 shown in FIG. 6 will be explained referring to FIG. 10 again. In the communication system, secondary stations 2 which are waiting with their status flags S set at "0", "1" or "2" exist at present. The down-link frame is received at the command/address detecting portions 21 of all the secondary stations 2 also this time. The operations of the secondary stations 2 whose status flags S are indicating "0" or "1" have already been explained. Now the operation of the secondary stations 2 whose status flags S are indicating "2" will be explained.

When the status flag S indicates "2", the command/address detecting portion 21 executes Steps S102 and S103 and moves to Step S111.

Next, the command/address detecting portion 21 determines whether the receive command 112 or the secondary station address of itself is set in the address slot $AS_m$ corresponding to the up-link channel $ch_m$ which the up-link frame generating/transferring portion 22 is now using (Step S111). The down-link frame of this time is generated in the contention mode and therefore no secondary station address is set in the address slots AS. Accordingly, the receive command 112 only will be explained. The determination in Step S111 is made as follows. First, the command/address detecting portion 21 extracts a command from the address slot $AS_m$ specified by the presently latched used channel information (explained above) and then determines whether the bit pattern of that command coincides with the bit pattern of the receive command 112 previously held inside. When they do not coincide, the command/address detecting portion 21 determines that the receive command 112 is not set, and then clears the used channel information from the register and moves to Step S115 described later. When they coincide, the command/address detecting portion 21 determines that the receive command 112 is set and moves to Step S112 without clearing the used channel information.

Figure 7B:
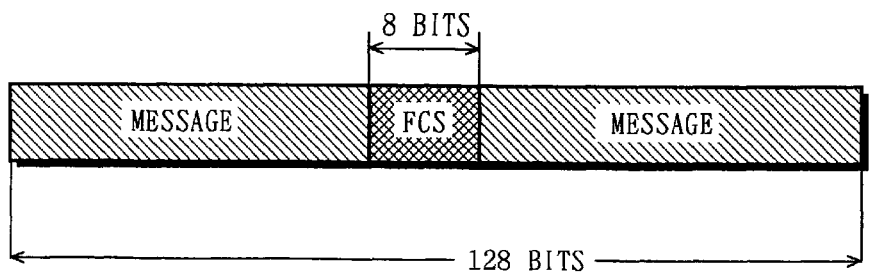

Next, the command/address detecting portion 21 signals to the up-link frame generating/transferring portion 22 to continue the transmission of data (Step S112). After generating such an up-link frame as shown in FIG. 7(a), the up-link frame generating/transferring portion 22 generates such an up-link frame as shown in FIG. 7(b) and sends it out onto the same channel. When receiving the notice from the command/address detecting portion 21, the up-link frame generating/transferring portion 22 continues the transfer of the up-link frames without suspending.

Next, the command/address detecting portion 21 determines whether the up-link frame generating/transferring portion 22 has completed the transmission of data (Step S113). The determination in Step S113 can be easily made by checking if the buffer memory is empty. When determining that the data transmission has been completed, the command/address detecting portion 21 sets the status flag S to "0" (Step S114) and waits for new transmission data to occur. On the other hand, if it determines that the data transmission has not been completed, the command/address detecting portion 21 returns to Step S102 leaving the status flag S unchanged at "2".

On the other hand, if it determines that the receive command 112 is not set in Step S111, the command/address detecting portion 21 determines that the up-link frame sent out from the up-link frame generating/transferring portion 22 is not validly received by the master station 1. That is to say, the command/address detecting portion 21 determines that the up-link frame generating/transferring portion 22 is performing invalid data communication and signals to the up-link frame generating/transferring portion 22 to suspend the data transmission (Step S115). At this time, the up-link frame generating/transferring portion 22, which is sending out generated up-link frames by using the up-link channel $ch_m$, suspends the sending out of the up-link frames, or the invalid data communication, in response to the notice of suspension. Thus, the secondary stations 2 in this communication system do not use the up-link channels for invalid data communication in a long time. This improves the utilization efficiency of the up-link channels.

Then the command/address detecting portion 21 sets the status flag S to "1" (Step S105) and returns to Step S102. When the status flag S is set to "1", the command/address detecting portion 21 executes the above-explained Step S109 in response to the next down-link frame. That is to say, the secondary station 2 executes retransmission control when up-link frames sent out by the secondary station 2 are not correctly received at the master station 1.

At present, the secondary stations $2a$, $2b$, $2c$, $2d$, $2f$ and $2j$ execute Step S111. In the down-link frame of this time, the receive command 112 is set in the address slots $AS_1$ and $AS_2$, the collision detection command 113 in the address slots $AS_3$ and $AS_4$, and the transmission enabling command 115 in the address slot $AS_5$. Hence, only the up-link frame generating/transferring portions 22 in the secondary stations $2a$ and $2b$ receive the notice of continuation from their respective command/address detecting portions 21 (Step S112). If the buffer memories in the secondary stations $2a$ and $2b$ have not been emptied yet, the up-link frame generating/transferring portions 22 of the secondary stations $2a$ and $2b$ continue to send out up-link frames onto the up-link channels $ch_1$ and $ch_2$. It is assumed that the up-link frames sent out from the secondary station $2a$ cause no data error on the up-link channel $ch_1$. It is also assumed that the up-link frames sent out from the secondary station $2b$ cause data error on the up-link channel $ch_2$. The up-link frame generating/transferring portions 22 in the secondary stations $2c$, $2d$, $2f$ and $2j$ receive the notice of suspension from their respective command/address detecting portions 21 (Step S115) and therefore suspend the transmission of up-link frames. Accordingly, the up-link channels $ch_3$ and $ch_4$ become free. It is further assumed that the secondary stations $2e$ and $2g$ have executed Steps S102, S106–S110 in response to the down-link frame of this time, so as to send out up-link frames onto the up-link channel $ch_5$. Therefore a communication collision occurs on the up-link channel $ch_5$.

Under these circumstances, as the status information, the first up-link frame receiving portion 131 outputs the second comparison output and the second receive information (normal), the second up-link frame receiving portion 132 outputs the second comparison output and the second receive information (error), the third up-link frame receiving portion 133 and the fourth up-link frame receiving portion 134 output only the third comparison output, and the fifth up-link frame receiving portion 135 outputs the first comparison output and the second receive information (UW undetected).

Presently, since the down-link frame generating/transferring portion 12 is in Step S2 shown in FIG. 8 and the mode flag $\alpha$ is indicating "0", and then it moves to Step S3 as in the previous time.

Next, the down-link frame generating/transferring portion 12 sets the slot pointer m to "1" (FIG. 9; Step S901) and determines a command to be set this time into the address slot $AS_1$ on the basis of the status information from the first up-link frame receiving portion 131. Presently receiving the second comparison output, the down-link frame generating/transferring portion 12 executes Steps S902 and S903 and moves to Step S912.

Next, the down-link frame generating/transferring portion 12 determines whether a data error is occurring in the up-link frame on the up-link channel $ch_m$ (Step S912). When receiving the second receive information (error), the down-link frame generating/transferring portion 12 determines that the data error has occurred and moves to Step S913 described later. When receiving the second receive information (normal), it determines that no data error is occurring and moves to Step S909. At present, since the down-link frame generating/transferring portion 12 is receiving the second receive information (normal), it moves to Step S909 to set the receive command 112 into the address slot $AS_1$.

Next, the down-link frame generating/transferring portion 12 updates the indication value of the slot pointer m from "1" to "2" (Steps S905, S906) and returns to Step S902. Then the down-link frame generating/transferring portion 12 determines a command to be set this time into the address slot $AS_2$ on the basis of the status information from the second up-link frame receiving portion 132.

Next, since the down-link frame generating/transferring portion 12 is presently receiving the second comparison output, it executes Steps S902 and S903 and moves to Step S912. Since the down-link frame generating/transferring portion 12 is receiving the second receive information (error), it executes the Step S912 and then accesses the memory portion 11 to extract the data error command 114 and sets it into the address slot $AS_m$ (Step S913). The master station 1 can also signal to the secondary station 2 using the up-link channel $ch_m$ that the up-link frame is not correctly received, so as to urge the station 2 to perform retransmission control. At present, the data error command 113 is set into the address slot $AS_2$, whereby the secondary station $2b$ is urged to perform retransmission control.

Next, the down-link frame generating/transferring portion 12 updates the indication value of the slot pointer m, currently indicating "2", to "3" (Steps S905, S906) and returns to Step S902. Then the down-link frame generating/transferring portion 12 determines a command to be set this time into the address slot $AS_3$ on the basis of the status information from the third up-link frame receiving portion 133.

Subsequently, the down-link frame generating/transferring portion 12 sequentially receives the status information from the third to fifth up-link frame receiving portions 133–135 and sequentially determines commands to be set into the address slots $AS_3$–$AS_5$ on the basis of the information. The operations of the down-link frame generating/transferring portion 12 in the individual cases have already been explained. Accordingly, they are not explained again. The transmission enabling commands 115 are set into the address slots $AS_3$ and $AS_4$ (Step S904). The collision detection command 113 is set into the address slot $AS_5$ (Step S910) and the indication value of the counter C1 is updated from "2" to "3" (Step S911). When having determined commands to be set into the address slots $AS_1$–$AS_5$, the down-link frame generating/transferring portion 12 assembles and sends out a down-link frame (Step S907), ends Step S3 (refer to FIG. 8), and moves to Step S4. The operation of each station 2 receiving the third down-link frame will be explained later.

Next, the down-link frame generating/transferring portion 12 executes Step S4 explained above. At present, the indication value of the counter C1 indicates "3". This indication value "3" is equal to the first certain value "3" (Step S4) and therefore the down-link frame generating/transferring portion 12 moves to Step S5 to update the mode flag $\alpha$ to "1" and update the counters C1 and T to "0" (Step S5). The down-link frame generating/transferring portion 12 now recognizes, in Step S4, that communication collisions have occurred for the number of times equal to or larger than the first certain value on the up-link channels while the counter T was counting from "0" to the third certain value and determines that it is not suitable to generate a down-link frame in the contention mode (FIG. 8; Step S3). The mode flag $\alpha$ is then updated to "1" and the next down-link frame is generated in the polling mode (FIG. 8; Step S9). The indication value of the counter C1 is updated to "0" so that it can newly count the number of communication collisions when the down-link frame is generated in the contention mode next time. Furthermore, the indication value of the counter T is updated to "0" to define a start of the time period for measuring the number of free channels.

Next, the down-link frame generating/transferring portion 12 updates the indication value of the counter T, presently "0", to "1" (Step S6) and returns to Step S2, since the indication value "1" has not reached the third certain value (Step S7).

The operation of the secondary station 2 shown in FIG. 6 will now be explained referring to FIG. 10 again. As is clear from the description, secondary stations 2 which are waiting with their status flags S set at "0", "1" or "2" are currently present in the communication system. The operations of these secondary stations 2 have already been described. Described next is the operation of a secondary station 2 which was urged to perform retransmission control with the collision detection command 113 or the data error command 114.

The command/address detecting portion 21 of a secondary station 2 which is to retransmit up-link frames waits with its status flag S set at "1", as stated above. When a down-link frame is transmitted, the secondary station 2 executes the above-described processing procedure (from Step S102 to S106–S110) for retransmission control.

If the buffer memory of the secondary station 2a is empty at the time when the third down-link frame is received, the command/address detecting portion 21 of the secondary station 2a sets the status flag S to "0" (Step S113) and waits for generation of new transmission data. Accordingly, the up-link channel $ch_1$ becomes free. The data error command 114 is set in the address slot $AS_2$ of the down-link frame of this time and the up-link frame generating/transferring portion 22 of the secondary station 2b receives a notice of suspension from the command/address detecting portion 21 (Step S115) and suspends the sending out of up-link frames. Accordingly, the up-link channel $ch_2$ becomes free. The secondary stations 2c, 2d, 2f and 2j execute retransmission control. As stated above, the third down-link frame contains the transmission enabling commands 115 in the address slots $AS_3$ and $AS_4$. Now suppose that only the secondary station 2j sends out an up-link frame onto the up-link channel $ch_3$ and the secondary stations 2c, 2d and 2f send out up-link frames onto the up-link channel $ch_4$.

The down-link frame of this time contains the collision detection command 113 in the address slot $AS_5$ and the up-link frame generating/transferring portions 22 of the secondary stations 2e and 2g receive the notice of suspension from their respective command/address detecting portions 21 (Step S115) and suspend the sending out of up-link frames. The up-link channel $ch_5$ thus becomes free.

Under these circumstances, the first up-link frame receiving portion 131, the second up-link frame receiving portion 132 and the fifth up-link frame receiving portion 135 output only the third comparison output as the status information. The third up-link frame receiving portion 132 outputs the first comparison output and the first receive information (UW detected) as the status information. The fourth up-link frame receiving portion 134 outputs the first comparison output and the first receive information (UW undetected) as the status information.

Now referring to FIG. 8 again, operation of the down-link frame generating/transferring portion 12 will be explained. The down-link frame generating/transferring portion 12 has returned to Step S2 and moves to Step S9, for the mode flag α is not indicating "0." When the mode flag α is indicating "1", the down-link frame generating/transferring portion 12 recognizes that communication collisions are occurring on a relatively large number of up-link channels and determines that it is better to generate a down-link frame in the polling mode.

Figure 11:
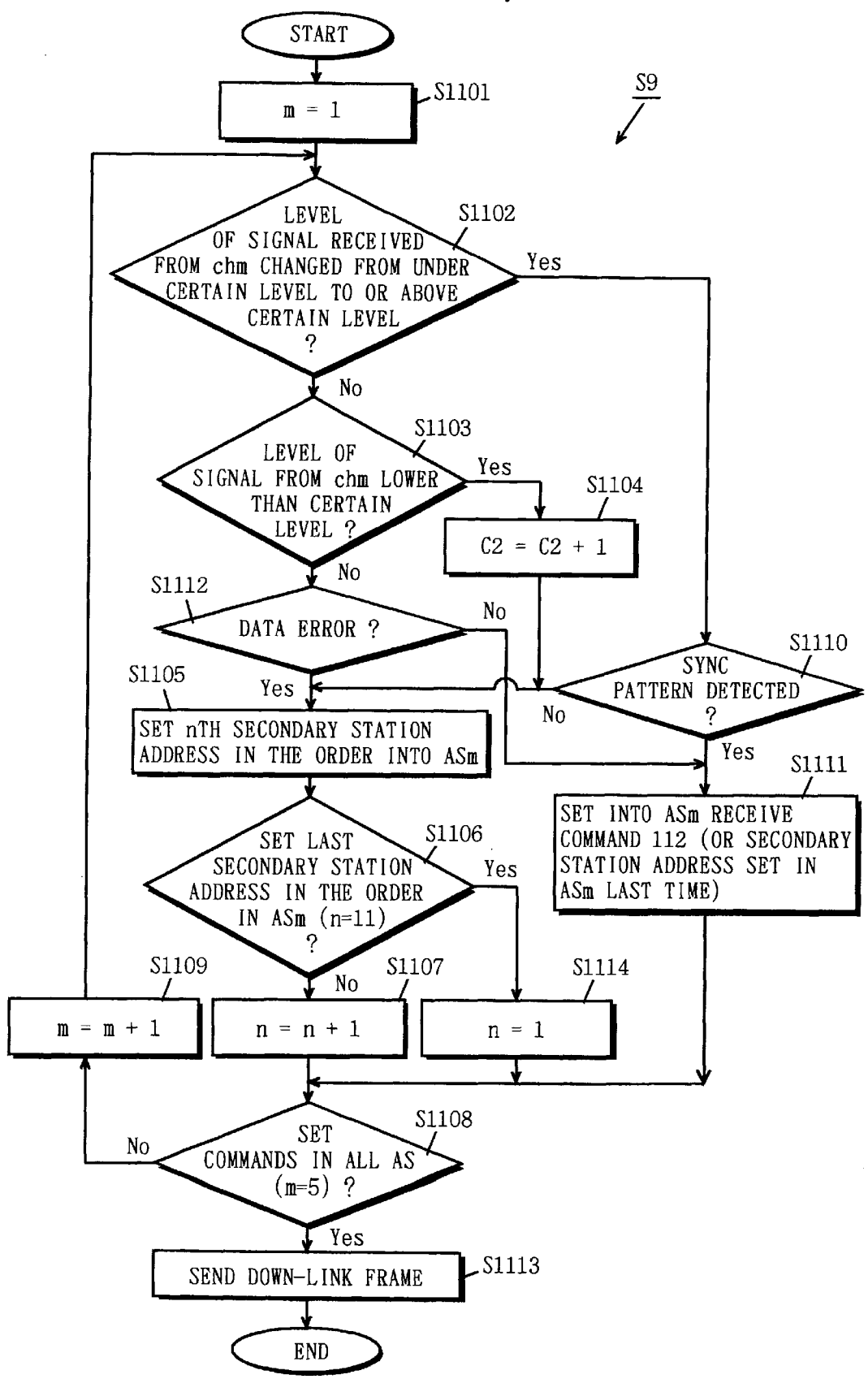
FIG. 11 is a flow chart showing the details of the operating procedure in Step S9 shown in FIG. 8.

FIG. 11 is a flow chart showing details of the processing procedure in Step S9 (the polling mode) shown in FIG. 8. First, the down-link frame generating/transferring portion 12 sets the slot pointer m to "1" (FIG. 11; Step S1101) and determines a secondary station address or a command to be set this time into the address slot $AS_1$ on the basis of the status information from the first up-link frame receiving portion 131.

Next, the down-link frame generating/transferring portion 12 executes Step S1102 similar to Step S902 (refer to FIG. 9). If the status information includes the first comparison output, the down-link frame generating/transferring portion 12 moves to Step S1110 explained later and if the status information includes no first comparison output, it moves to Step S1103. Currently receiving the third comparison output, the down-link frame generating/transferring portion 12 moves to Step S1103.

Next, the down-link frame generating/transferring portion 12 executes Step S1103 similar to Step S903 (refer to FIG. 9). When the status information includes the second comparison output, it moves to Step S1112 explained later and if the status information includes the third comparison output, it moves to Step S1104. At present, as is clear from the description above, the down-link frame generating/transferring portion 12 moves to Step S1104.

As stated above, an up-link channel $ch_m$ is free when the mth up-link frame receiving portion 13m outputs the third comparison output. Accordingly, the down-link frame generating/transferring portion 12 updates the counter C2 for counting the number of free channels to "C2+1" (Step S1104). At present, the indication value of the counter C2 is updated from "0" to "1".

Next, the down-link frame generating/transferring portion 12 accesses the memory portion 11 to extract a secondary station address specified by the indication value of the address pointer n from the address table 111 (refer to FIG. 3) and sets that secondary station address into the address slot $AS_m$ (Step S1105). Thus the master station 1 can assign the free, up-link channel $ch_m$ to a single secondary station 2. At present, since the address pointer n indicates "1", the secondary station address "a" is set into the address slot $AS_1$.

Next, the down-link frame generating/transferring portion 12 determines whether the last secondary station address in the order (hereinafter referred to as "the last secondary station address") has been set in an address slot $AS_m$ (Step S1106). When having decided that the last secondary station address had been set, the down-link frame generating/transferring portion 12 moves to Step S1114 described later, and when having determined that the last secondary station had not been set, it moves to Step S1107. Since this communication system accommodates 11 secondary stations 2, the determination in Step S1106 is made depending on whether the address pointer n is indicating "11."

Next, since the address pointer n is currently indicating "1", the down-link frame generating/transferring portion 12 updates the indication value of the address pointer n to "n+1" so that it can extract the secondary station addresses in the order from the address table 111 (Step S1107). At present, the indication value of the address pointer n is updated from "1" to "2."

Next, the down-link frame generating/transferring portion 12 updates the indication value of the slot pointer m, presently indicating "1", to "2" (Steps S1108, S1109) and returns to step S1102. Then the down-link frame generating/transferring portion 12 determines a command or a secondary station address to be set this time into the address slot $AS_2$ on the basis of the status information from the second up-link frame receiving portion 132. As this status information has the same contents as that from the first up-link frame receiving portion 131, the down-link frame generating/transferring portion 12 executes the processing (described above) shown in the order of Steps S1102–S1109. As the result, the count of the counter C2 is updated from "1" to "2" (Step S1104), the secondary station address "b" is set into the address slot $AS_2$ this time (Step S1105), the indication value of the address pointer n is updated from "2" to "3" (Step S1107) and the indication value of the slot pointer m is updated from "2" to "3" (Step S1109). After that, the down-link frame generating/transferring portion 12 returns to Step S102 and determines a command to be set this time into the address slot $AS_3$ on the basis of the status information from the third up-link frame receiving portion 133.

Since the down-link frame generating/transferring portion 12 is presently receiving the first comparison output, it executes Step S1102 and then executes Step S1110 similar to Step S908 (refer to FIG. 9). Since it is presently receiving the first receive information (UW detected), the down-link frame generating/transferring portion 12 moves to Step S1111 (Step S1110) and sets the receive command 112 into the address slot $AS_m$ (Step S1111), similarly to Step S909 (refer to FIG. 9). The secondary station address set last time may be set into the address slot $AS_m$ in this Step S1111. At present, the receive command 1112 is set into the address slot $AS_3$.

Next, the down-link frame generating/transferring portion 12 updates the indication value of the slot pointer m from "3" to "4" (Steps S1108, S1109) and returns to Step S1102. Then the down-link frame generating/transferring portion 12 determines a command or a secondary station address to be set this time into the address slot $AS_4$ on the basis of the status information from the fourth up-link frame receiving portion 134.

Since the down-link frame generating/transferring portion 12 is presently receiving the first comparison output, it executes Step S1102 and then it moves to Step S1105 (Step S1110) since it is receiving the first receive information (UW undetected).

Next, the down-link frame generating/transferring portion 12 sets the secondary station address "c" specified by the address pointer n currently indicating "3" into the address slot $AS_4$ (Step S1105).

Then the indication value of the address pointer n is updated from "3" to "4" (Step S1107) and the indication value of the slot pointer m presently indicating "4" is updated to "5" (Steps S1108, S1109). Then the down-link frame generating/transferring portion 12 returns to Step S1102 and determines a command or a secondary station address to be set this time into the address slot $AS_5$ on the basis of the status information from the fifth up-link frame receiving portion 135. This status information has the same contents as that from the first up-link frame receiving portion 131 explained above.

Accordingly, the down-link frame generating/transferring portion 12 executes the processings (explained above) shown in the order of Steps S1102–S1108. Consequently, the count of the counter C2 is updated from "2" to "3" (Step S1104), the secondary station address "d" is set into the address slot $AS_5$ (Step S1105), and the indication value of the address pointer n is updated from "4" to "5" (Step S1107). Subsequently, the down-link frame generating/transferring portion 12 moves to Step S1113 because the slot pointer m is indicating "5" (Step S1108).

Next, the down-link frame generating/transferring portion 12 executes Step S1113 similar to Step S907 (refer to FIG. 9), to assemble a down-link frame (refer to FIG. 4) and send it out onto the down-link channel. Step S9 shown in FIG. 8 is thus ended. Operations of the secondary stations 2 receiving the fourth down-link frame will be explained later.

Refer to FIG. 8 again. Next, having finished Step S9, the down-link frame generating/transferring portion 12 determines whether the counter C2 is indicating a second certain value or a higher value (Step S10). The second certain value is a value for determining whether to update the mode flag α from "1" to "0", which is set to an appropriate value suitable to the specification of the communication system, similarly to the first certain value (explained above). Now the second certain value is assumed to be "4" hereinafter.

If the counter C2 is indicating a value equal to or larger than the second certain value in Step S10, the down-link frame generating/transferring portion 12 determines that it is better to generate a down-link frame in the contention mode and moves to Step S11. On the other hand, if the counter C2 is indicating a value smaller than the second certain value, the down-link frame generating/transferring portion 12 determines that it is suitable to generate a down-link frame in the polling mode and moves to step S6. At present, the counter C2 is indicating "3". The down-link frame generating/transferring portion 12 moves to step S6 since the indication value is smaller than the second certain value "4."

Next, the indication value of the counter T is updated from "1" to "2" (Step S6) and the down-link frame generating/transferring portion 12 returns to Step S2 since this indication value, "2", has not reached the third certain value "3" (Step S7).

The responding operations of the secondary stations 2 for the down-link frame generated in the polling mode will be explained referring to FIG. 10. When the status flags are indicating "0" and "2", the secondary stations 2 respond in the same way in the contention mode and the polling mode. Therefore, only the response of the secondary stations 2 in the case where the status flag S is indicating "1" will be explained.

As has been described above, when the status flag S of the command/address detecting portion 21 is indicating "1" in a certain secondary station 2, it means that the secondary station 2 has transmission data to the master station 1 and the data must be transmitted from the head.

When a down-link frame is transmitted, the command/address detecting portion 21 of the secondary station 2 whose status flag S is indicating "1" executes Step S102 and then determines whether the secondary station address of the secondary station 2 is set in any of the address slots AS (Step S106). The determination in Step S106 is typically made as follows. The command/address detecting portion 21 holds, in advance, the bit pattern of this station address in a register (not shown) included therein. The command/address detecting portion 21 determines whether this bit pattern is set in the address slots $AS_1$–$AS_5$ in the down-link frame. When this station address is set in an address slot $AS_m$, the command/address detecting portion 21 recognizes that the up-link channel $ch_m$ corresponding to the slot $AS_m$ has been assigned by the master station 1 and moves to Step S109. When this station address is not set in any of the address slots AS, the command/address detecting portion 21 determines that an up-link channel $ch_m$ was not assigned this time, and moves to Step S107. In the polling mode, however, no transmission enabling command 115 is set in the address slots AS. Accordingly, the command/address detecting portion 21 returns to step S102 and waits for a new down-link frame.

The command/address detecting portion 21 moves to Step S109 and then signals to the up-link frame generating/transferring portion 22 to send out the up-link frame by using the up-link channel $ch_m$ corresponding to the address slot $AS_m$ from which this station address has been detected (Step S109). The command/address detecting portion 21 then latches the address slot $AS_m$ assigned in Step S106 as used channel information into a register (not shown). This used channel information is used in Step S111, as stated before. After that, the secondary station 2 operates in the same way in the contention mode and the polling mode.

If the status flag S is at "0" and transmitted data is not stored in the buffer memory when the down-link frame of this time is received, the command/address detecting portions 22 of the secondary stations 2a and 2b execute Steps S102 to S104 and return to Step S102. Accordingly, the up-link frame generating/transferring portions 22 of the secondary stations 2a and 2b do not send out up-link frames onto the up-link channels $ch_1$ and $ch_2$. Accordingly, the up-link channels $ch_1$ and $ch_2$ become free. Note that the secondary station 2b suspends to send it out in response to the previous (third) down-link frame, however, for the convenience of description of the communication network, it is assumed that the secondary station 2b is in the above state. The status flag of the secondary station 2j is at "2" when the down-link frame of this time is received. The down-link frame of this time has the receive command 112 in the address slot $AS_3$ and the up-link frame generating/transferring portion 22 of the secondary station 2j receives the notice of continuation from the command/address detecting portion 21 (Step S112) and it continues to send out up-link frames onto the up-link channel $ch_3$. It is assumed that no data error occurs in the up-link frame on the up-link channel $ch_3$. As the command/address detecting portions 21 of the secondary stations 2c and 2d have their respective status flags S set at "1" when the down-link frame of this time is received, they execute Steps S106, S109 and S110, and detect the secondary station addresses "c" and "d" from the address slots $AS_4$ and $AS_5$ of the frame. As is clear, the up-link frame generating/transferring portions 22 of the secondary stations 2c and 2d send out up-link frames onto the up-link channels $ch_4$ and $ch_5$. However, it is assumed that another secondary station 2g has erroneously sent out an up-link frame onto the up-link channel $ch_5$.

Under these circumstances, the first up-link frame receiving portion 131 and the second up-link frame receiving portion 132 output only the third comparison output as the status information. The third up-link frame receiving portion 132 outputs the first comparison output and the second receive information (normal) as the status information. The fourth up-link frame receiving portion 134 outputs the first comparison output and first receive information (UW detected). The fifth up-link frame receiving portion 135 outputs the first comparison output and the first receive information (UW undetected).

At present, the down-link frame generating/transferring portion 12 is in Step S2 shown in FIG. 8 and the mode flag α is indicating "1", and therefore the down-link frame generating/transferring portion 12 moves to Step S9 as in the previous time.

Next, the down-link frame generating/transferring portion 12 sets the slot pointer m to "1" (FIG. 11; Step S1101). As is clear from the description above, the status information from the first up-link frame receiving portion 131 and that from the second up-link frame receiving portion 132 have the same contents as those from the first up-link frame receiving portion 131 and the like which the down-link frame generating/transferring portion 12 has referred to when generating the previous down-link frame. Accordingly, the down-link frame generating/transferring portion 12 executes the above-described processings shown in the order of Steps S1102–S1109 twice. As the result, the counter C2 indicates "5" (Step S1104), the secondary station addresses "e" and "f" are set into the address slots $AS_1$ and $AS_2$ (Step S1105), the address pointer n indicates "7" (Step S1107) and the slot pointer m indicates "3" (Step S1109). Subsequently, the down-link frame generating/transferring portion 12 returns to Step S1102 and determines a command or a secondary station address to be set this time into the address slot $AS_3$ on the basis of the status information from the third up-link frame receiving portion 133.

As the down-link frame generating/transferring portions 12 is presently receiving the second comparison output, it executes Steps S1102 and S1103 and then executes Step S1112 similar to Step S912 (refer to FIG. 9). If the down-link frame generating/transferring portion 12 is receiving the second receive information (error), it moves to Step S1105 explained above, and if receiving the second receive information (normal), it moves to step 1111.

Since the down-link frame generating/transferring portion 12 is currently receiving the second receive information (normal), it sets the receive command 112 into the address slot $AS_m$ (Step S1111). At present, the receive command 112 is set into the address slot $AS_3$.

Next, the down-link frame generating/transferring portion 12 updates the indication value of the slot pointer m, currently indicting "3", to "4" (Steps S1108, S1109) and returns to step S1102. Then the down-link frame generating/transferring portion 12 determines a command or a secondary station address to be set this time into the address slot $AS_4$ on the basis of the status information from the fourth up-link frame receiving portion 134.

Since this status information has the same contents as that from the third up-link frame receiving portion 133 which the down-link frame generating/transferring portion 12 referred to when generating the previous down-link frame, the down-link frame generating/transferring portion 12 executes the processing shown in the order of Steps S1102→S1110→S1111→S1108→S1109 (already explained). As the result, the receive command 112 (or the secondary station address "c") is set in the address slot $AS_4$ (Step S1111) and the slot pointer m indicates "5" (Step S1109). Then the down-link frame generating/transferring portion 12 returns to Step S1102 and determines a command or a secondary station address to be set this time into the address slot $AS_5$ on the basis of the status information from the fifth up-link frame receiving portion 135.

Since the down-link frame generating/transferring portion 12 is now receiving the first comparison output and is receiving the first receive information (UW undetected), it executes Step S1102 and it then moves to Step S1110 to set the secondary station address "g" into the address slot $AS_5$ (Step S111).

Next, the down-link frame generating/transferring portion 12 updates the indication value of the address pointer n, currently indicating "7", to "8" (Step S1107). Then since the slot pointer m is indicating "5" (Step S1108), it assembles and sends out a down-link frame (Step S1113). The down-link frame generating/transferring portion 12 thus ends Step S9 shown in FIG. 8 and moves to Step S10.

Next, since the present indication value "5" of the counter C2 is larger than the second certain value "4" (Step S10), the down-link frame generating/transferring portion 12 moves to Step S11. The down-link frame generating/transferring portion 12 updates the mode flag α to "0" and updates the counters C2 and T to "0" (Step S10). In Step S10, the down-link frame generating/transferring portion 12 recognizes that free channels have occurred for the number equal to or larger than the second certain value while the counter T was counting from "0" to the third certain value and determines that generating a down-link frame in the polling mode (FIG. 8; Step S9) is not suitable to the present condition. The mode flag α is updated to "0" and the down-link frame is generated in the contention mode (FIG. 8; Step S3) the next time. The indication value of the counter C2 is updated to "0" so that it can newly count the number of free channels when a down-link frame is generated in the polling mode the next time. The counter T is updated to "0", so as to define the start of the time period for measuring the number of communication collisions. Next, the down-link frame generating/transferring portion 12 updates the indication value of the counter T, currently indicating "0", to "1" (Step S6) and returns to Step S2, since this indication value "1" has not reached the third certain value "3" (Step S7).

As have been explained so far, according to the communication system of the first embodiment, the down-link frame generating/transferring portion 12 generates a down-link frame in the contention mode when the up-link channels are not crowded and generates a down-link frame in the polling mode when the up-link channels are crowded. This allows the secondary stations 2 accommodated in the communication system to always obtain high throughput and response irrespective of whether the up-link channels are crowded or not crowded.

If the indication value of the counter T reaches the third certain value in Step S7 (refer to FIG. 8), Step S8 is executed. In Step S8, the down-link frame generating/transferring portion 12 updates the counters C1, C2 and T to "0". This Step S8 is necessary to measure the number of communication collisions or the number of free channels again when communication collisions did not occur as many as or exceeding the first certain value on the up-link channels or free channels did not occurred as many as or exceeding the second certain value while the counter T counted from "0" to the third certain value.

When the polling mode (FIG. 9; Step S9) is repeated, the indication value of the address pointer n eventually achieves "11." Then the down-link frame generating/transferring portion 12 updates the indication value of the address pointer n to "1" (FIG. 11; Step S1114).

Next, a communication system to which is applied to an access control method according to a second embodiment of the present invention will be explained. The second embodiment differs from the first embodiment only in that only the polling mode (refer to FIG. 11) is executed. (Note that the down-link frame generating/transferring portion 12 in this embodiment does not have to determine whether to generate a down-link frame in the polling mode or to generate a down-link frame in the contention mode and therefore does not execute Step S1104.) The structure of the communication system is, in other respects, the same as that in the first embodiment and the corresponding parts are shown at the same reference numerals.

Figure 12:
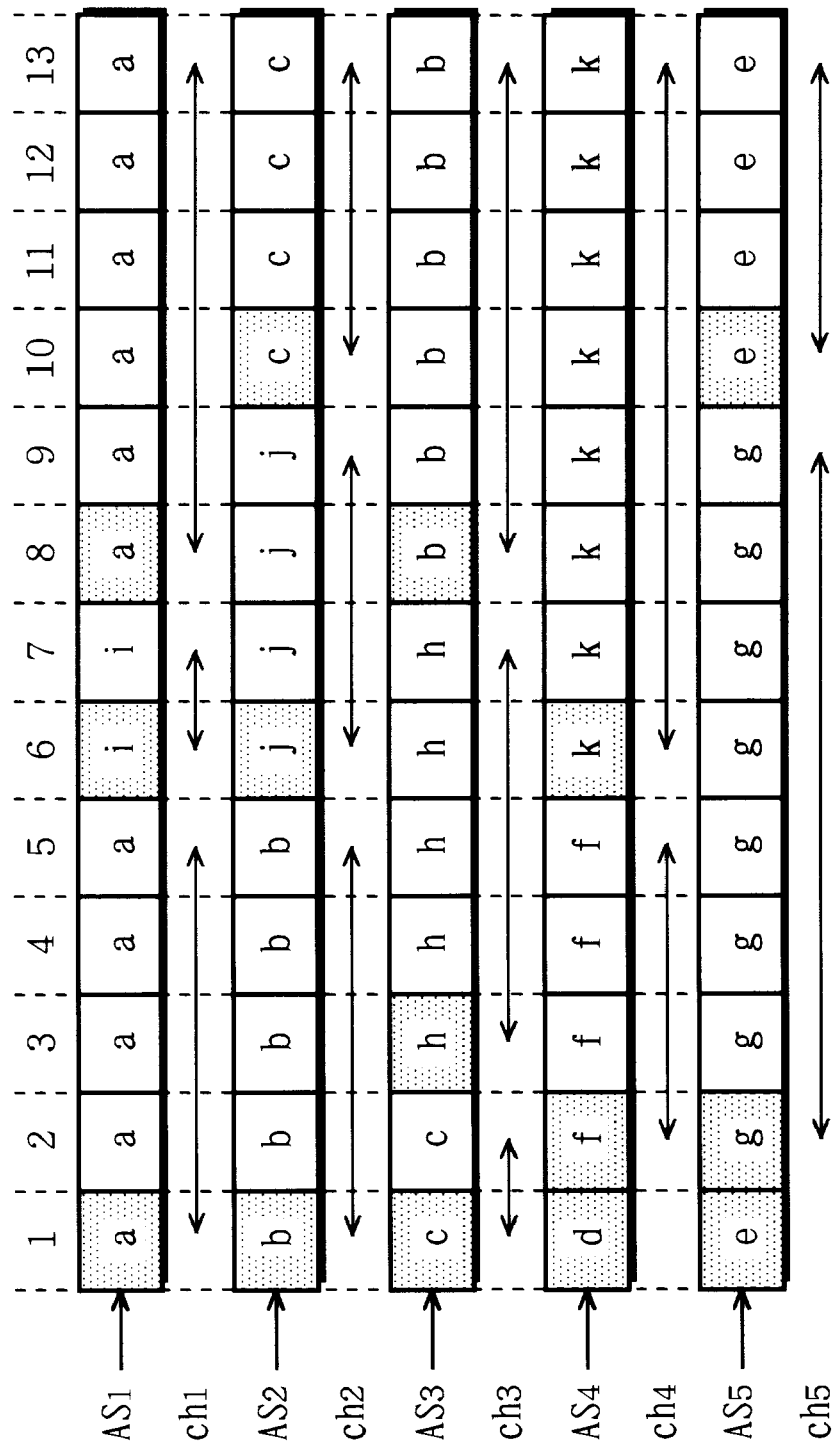
FIG. 12 is a diagram showing transitions of states of the secondary station addresses set in the address slots in the down-link frames and the communication status of the up-link channels in the case where an access control method of a second embodiment of the present invention is applied.

FIG. 12 is a diagram showing transitions of states of the secondary station addresses set in the address slots AS of the down-link frames and the communication states of the up-link channels in the case of the access control method of the second embodiment.

The down-link frame generating/transferring portion 12 sets the indication value of the slot pointer m to "1" (Step S1101). In this embodiment, the indication value of the address pointer n is updated to "1" at the same time in Step S1101. The following processings are clear from the first embodiment and hence not described again.

When the communication system is in an initial state, no up-link frames are transferred on the up-link channels. Hence, after Step S1101, the down-link frame generating/transferring portion 12 executes the processing procedure shown in the order of Steps S1102→S1103→S1105 to S1109 four times and then executes Steps S1102→S1103→S1105 to S1108→S1113, where it executes the same operations in the individual steps as those described above. Accordingly, the indicated values of the slot pointer m and the address pointer n make transitions as "1"→"2"→"3"→"4"→"5." If the indication value m is "5" in Step S1108, the down-link frame generating/transferring portion 12 ends the generation of the first down-link frame and sends out the down-link frame onto the down-link channel (Step S1113). When the slot pointer m and the address pointer n indicate "1", the down-link frame generating/transferring portion 12 extracts the secondary station address "a" associated with "1" in the order from the address table 111 (refer to FIG. 3) and sets the secondary station address "a" into the address slot $AS_1$. Similarly, the down-link frame generating/transferring portion 12 sets the secondary station address "b" into the address slot $AS_2$, the secondary station address "c" into the address slot $AS_3$, the secondary station address "d" into the address slot $AS_4$, and the secondary station address "e" into the address slot $AS_5$ (refer to $AS_1$–$AS_5$ in the first down-link frame in FIG. 12). As the result, the down-link frame generating/transferring portion 12 assigns the up-link channels $ch_1$–$ch_5$ to the secondary stations 2a–2e. When the master station 1 sends out the first down-link frame, the address pointer n indicates "6".

Next, the operation of each secondary station 2 for the first down-link frame is not explained because it is the same as that in the first embodiment. In response to the first down-link frame, the secondary stations 2a–2e send out up-link frames onto the up-link channels $ch_1$–$ch_5$ (refer to the up-link channels $ch_1$–$ch_5$ in FIG. 12).

After the second certain time has passed after sending out of the first down-link frame, the down-link frame generating/transferring portion 12 generates a second down-link frame. At this time, the up-link frames from the secondary stations 2a–2e have been sent out onto the up-link channels $ch_1$–$ch_5$. It is assumed that the up-link frames from the up-link channels $ch_1$–$ch_3$ cause no communication collision. However, it is assumed that the up-link frames from the up-link channels $ch_4$ and $ch_5$ cause communication collisions because secondary stations to which the up-link channel $ch_4$ or $ch_5$ is not assigned have erroneously sent out up-link frames.

As is clearly seen by referring to the description of the first embodiment, the down-link frame generating/transferring portion 12 sets the secondary station addresses "a"–"c" in the address slots $AS_1$–$AS_3$ again in the second down-link frame and sets the secondary station addresses "f" and "g" into the address slots $AS_4$ and $AS_5$. When having generated the second down-link frame, the down-link frame generating/transferring portion 12 sends out the down-link frame onto the down-link frame (refer to $AS_1$–$AS_5$ of the second down-link frame in FIG. 12). The second down-link frame newly assigns the up-link channels to the secondary stations 2f and 2g.

Each secondary station 2 operates in response to the first down-link frame in the same way as that described in the first embodiment and therefore it is not described again. In response to the second down-link frame, the secondary stations 2a, 2b, 2f and 2g send out up-link frames onto the up-link channels $ch_1$, $ch_2$, $ch_4$ and $ch_5$, but the secondary station 2c does not send out an up-link frame onto the up-link channel $ch_3$ (refer to FIG. 12, the up-link channels $ch_1$–$ch_5$).

After the second certain time has passed after the second down-link frame was sent out, the down-link frame generating/transferring portion 12 generates a third down-link frame. At this time, the up-link frames have been sent out onto the up-link channels $ch_1$, $ch_2$, $ch_4$ and $ch_5$. It is assumed that the up-link frames from the up-link channels $ch_1$, $ch_2$, $ch_4$ and $ch_5$ cause no error and no communication collision.

As is clearly seen from the description in the first embodiment, the down-link frame generating/transferring portion 12 sets the secondary station addresses "a", "b", "f", and "g" (or the receive commands 112) into the address slots $AS_1$, $AS_2$, $AS_4$ and $AS_5$ again in the third down-link frame, and sets the secondary station address "h" into the address slot $AS_3$. When having generated the third down-link frame, the down-link frame generating/transferring portion 12 sends out that down-link frame onto the down-link channel (refer to FIG. 12, $AS_1$–$AS_5$ in the third down-link frame). The third down-link frame newly assigns an up-link channel to the secondary station 2h.

When the down-link frame generating/transferring portion 12 thus executes only the polling mode, the following effects are provided. The down-link frame generating/transferring portion 12 assigns the up-link channels to the secondary stations 2 according to the order set in the address table 111 every time when it detects a free channel. Therefore the congested state does not occur only on a certain up-link channel.

The down-link frame generating/transferring portion 12 also detects invalid data communication on the basis of the status information from the up-link frame receiving portion 13. The down-link frame generating/transferring portion 12 cancels the allocation of the up-link channel to a secondary station 2 performing such invalid data communication and assigns the up-link channel used in the invalid data communication to a new secondary station 2 according to the order above. That is to say, the down-link frame generating/transferring portion 12 prevents, in advance, reduction of the response and the throughput of the secondary stations 2 due to invalid data communication. This enables effective utilization of the up-link channels. This effect is provided also in the polling mode in the above-described first embodiment.

In the above-described first and second embodiments, the table shown in FIG. 3 is used as the address table 111. The address table 111 shown in FIG. 3 defines priorities in the sense that an up-link channel is assigned to the earliest secondary station 2a earliest and to the secondary station 2k latest. However, all secondary stations 2 are permitted to use the up-link channels once per 11 times. When the table shown in FIG. 13 is used, the secondary station 2a is, unlike other secondary stations 2, permitted to use the up-link channels once per six times. This provides the effect of enhancing the response and throughput of the secondary station 2a when the secondary station 2a generates up-link frames more frequently than other secondary stations 2.

Next, a communication system to which an access control method according to a third embodiment of the present invention is applied will be explained. Although the structure of this communication system is not described here because it is the same as that of the communication system shown in FIG. 1, it differs from that shown in FIG. 1 in the following respects.

The secondary stations 2 connected to the transmission path 3 is divided into a plurality of predetermined groups. For example, in this embodiment, 11 secondary stations 2 are divided into two groups (a first group and a second group), the secondary stations 2a–2e belonging to the first group and the secondary stations 2f–2k belonging to the second group. The up-link channels $ch_1$–$ch_3$ are assigned to the first group and the up-link channels $ch_4$ and $ch_5$ are assigned to the second group. Accordingly, the table shown in FIG. 14 is used as the address table in the master station 1, for example. In FIG. 14, the address table contains for each group secondary station addresses provided with the order for assigning the up-link channels to the secondary stations. That is to say, the secondary station addresses "a"–"e" are set in the first order "1"–"5" in the first group (which is referred to as "a first table" hereinafter) and the secondary station addresses "f"–"k" are set in the second order "1"–"6" in the second group (which is referred to as "a second table").

The down-link frame generating/transferring portion 12 in the master station 1 includes an address pointer n for each group. Hence, it includes two, first and second address pointers $n_1$ and $n_2$ in this embodiment. The first address pointer $n_1$ counts up one by one from "1" to "5" as instructed by the down-link frame generating/transferring portion 12. The indication value of the first address pointer $n_1$ indicates the first order shown above. The second address pointer $n_2$ counts up, one by one, from "1" to "6" as instructed by the down-link frame generating/transferring portion 12. The indication value of the second address pointer n shows the second order.

The down-link frame generating/transferring portion generates the down-link frames on the basis of the flow chart shown in FIG. 15. The flow chart shown in FIG. 15 is formed of two of the flow charts shown in FIG. 11 sequentially connected, wherein free channels are detected from the up-link channels $ch_1$–$ch_3$ and assigned to the secondary stations 2a–2e in the first group on the basis of the first order (Step S121). Then free channels are detected from the up-link channels $ch_4$ and $ch_5$ and assigned to the secondary stations 2f–2k in the second group on the basis of the second order (Step S122). Hence, the down-link frame generating/transferring portion 12 sets the secondary station addresses extracted from the first table described above into the address slots $AS_1$–$AS_3$ in the down-link frame, thereby assigning the up-link channels $ch_1$–$ch_3$ to any of the secondary stations 2a–2e. It sets secondary station addresses extracted from the second table described above into the address slots $AS_4$ and $AS_5$ in the down-link frame, thereby assigning the up-link channels $ch_4$ or $ch_5$ to any of the secondary stations 2f–2k.

Various kinds of information, such as computer data, audio data, etc., are exchanged between the master station 1 and the secondary stations 2. While, in general, the audio data is generated, to some degree, in a fixed amount, the computer data is generated in various amounts. Furthermore, in many cases, audio data and so on loses its meaning as audio data if response and throughput are not secured. When secondary stations 2 communicating of such audio data and so on and secondary stations 2 communicating of computer data requiring no ensured response and throughput are mixed in a communication system, the response and throughput of the secondary stations 2 making audio data communication and so on may not be secured. Accordingly, in the second embodiment, the secondary stations 2 connected to the master station 1 are grouped according to the attributes of the information they handle. The up-link channels are assigned in an unoverlapping manner for each group. When detecting a free channel, the master station 1 selects a secondary station 2 from the group to which the free channel is assigned. Accordingly, when the secondary stations communicating of audio data and so on are grouped, for example, it is possible to ensure the periodicity in assigning the up-link channels to the secondary stations in the group, which provides ensured response and throughput in the group.

The address table shown in FIG. 13 described in the second embodiment may be applied to the third embodiment to improve the response and throughput of a certain secondary station 2. Or, it may be constructed so that the receive command 112 and the like can be set in the address slots.

While the invention has been described in detail, the foregoing description is in all aspects illustrative and not restrictive. It is understood that numerous other modifications and variations can be devised without departing from the scope of the invention.

What is claimed is:

1. A method for controlling access from secondary stations to a master station in a communication system in which the master station and a plurality of the secondary stations can bi-directionally communicate, said method comprising:

wherein the master station is operable to use a down-link channel to transfer down-link signals, and each of the secondary stations is operable to use a plurality of up-link channels to transfer up-link signals;

wherein the master station detects currently unused one(s) of the up-link channels as free channel(s) and selects one(s) of the secondary stations of a number corresponding to the detected free channel(s);

assigns each of the free channel(s) to each of the selected secondary station(s); and generates a down-link signal for signaling the free channel(s) in order to notify the selected secondary station(s) of the free channel(s) and sends out the down-link signal onto the down-link channel;

the secondary stations determine whether the up-link channels are assigned thereto on the basis of the down-link signal inputted from the down-link channel;

wherein each of the secondary stations send out the up-link signal onto one of the up-link channels assigned thereto only when any of the up-link channels is assigned thereto and each of the secondary stations has data to transmit to the master station;

wherein the master station detects whether an up-link signal is being transferred on each of the up-link channels in a certain period after sending out the down-link signal to detect the free channel(s);

wherein the up-link signal includes an error detecting code, and wherein the master station detects whether an error is occurring in a received up-link signal on the basis of an error detecting code included in the up-link signal; and when an error is occurring in the received up-link signal, the master station selects a secondary station other than the secondary station to which the up-link channel carrying the up-link signal was assigned, and assigns the up-link channel carrying the received up-link signal to the selected secondary station.

2. A method for controlling access from secondary stations to a master station in a communication system in which the master station and a plurality of the secondary stations can bi-directionally communicate, said method comprising:

wherein the master station is operable to use a down-link channel to transfer down-link signals, and each of the secondary stations is operable to use a plurality of up-link channels to transfer up-link signals;

wherein the master station detects currently unused one(s) of the up-link channels as free channel(s) and selects one(s) of the secondary stations of a number corresponding to the detected free channel(s);

assigns each of the free channel(s) to each of the selected secondary station(s); and generates a down-link signal for signaling the free channel(s) in order to notify the selected secondary station(s) of the free channel(s) and sends out the down-link signal onto the down-link channel;

the secondary stations determine whether the up-link channels are assigned thereto on the basis of the down-link signal inputted from the down-link channel;

wherein each of the secondary stations send out the up-link signal onto one of the up-link channels assigned thereto only when any of the up-link channels is assigned thereto and each of the secondary stations has data to transmit to the master station;

wherein the master station detects whether an up-link signal is being transferred on each of the up-link channels in a certain period after sending out the down-link signal to detect the free channel(s);

wherein the master station detects whether up-link signals are causing a communication collision on the up-link channels assigned to the secondary stations; and wherein, when detecting the communication collision, the master station selects a secondary station other than the secondary station to which the up-link channel suffering the communication collision was assigned, and assigns the up-link channel suffering the communication collision to the selected secondary station.

3. A method for controlling access from secondary stations to a master station in a communication system in which the master station and a plurality of the secondary stations can bi-directionally communicate, said method comprising:

wherein the master station is operable to use a down-link channel to transfer a down-link signal, and each of the secondary stations is operable to use a plurality of up-link channels to transfer up-link signals;

wherein the master station detects an unused up-link channel as a free channel; and generates a down-link signal for signaling the detected free channel in order to notify the secondary stations of the detected free channel and sends out the down-link signal onto the down-link channel;

wherein the secondary stations recognize the up-link channel which is currently free from the down-link signal inputted from the down-link channel and sends out the up-link signals onto the free channel;

when an error is occurring in the up-link signal inputted from an up-link channel, the master station generates a down-link signal including a data error command indicative of the occurrence of error and sends it out onto the down-link channel; and the secondary station which is sending out the up-link signal suspends the transmission of the up-link signal on the basis of the data error command.

4. A method as claimed in claim 3, wherein when having suspended transmission of the up-link signal, each of the secondary stations retransmits the data.

5. A method for controlling access from secondary stations to a master station in a communication system in which the master station and a plurality of the secondary stations can bi-directionally communicate, said method comprising:

wherein the master station is operable to use a down-link channel to transfer a down-link signal, and each of the secondary stations is operable to use a plurality of up-link channels to transfer up-link signals;

wherein the master station detects an unused up-link channel as a free channel;

generates a down-link signal for signaling the detected free channel in order to notify the secondary stations of the detected free channel and sends out the down-link signal onto the down-link channel; and wherein the secondary stations recognize the up-link channel which is currently free from the down-link signal inputted from the down-link channel and sends out the up-link signals onto the free channel;

wherein the master station detects the level of a received signal on each of the up-link channels, and when the level of the received signal has reached or exceeded a certain level on any of the up-link channels, the master station generates a down-link signal including a receive command for signaling that the master station has received the up-link signal and transmits the down-link signal to the secondary station sending out the up-link signal onto that up-link channel; and wherein each of the secondary stations continues to send out the up-link signal on the basis of the receive command, and wherein the secondary stations suspend transfer of up-link signals when they can not recognize the receive command in the down-link signal received from the down-link channel.

6. A method as claimed in claim 5, wherein when having suspended transmission of the up-link signal, each of the secondary stations retransmits the data.

7. A method for controlling access from secondary stations to a master station in a communication system in which the master station and a plurality of the secondary stations can bi-directionally communicate, said method comprising:

wherein the master station is operable to use a down-link channel to transfer a down-link signal, and each of the secondary stations is operable to use a plurality of up-link channels to transfer up-link signals;

wherein the master station detects an unused up-link channel as a free channel; and generates a down-link signal for signaling the detected free channel in order to notify the secondary stations of the detected free channel and sends out the down-link signal onto the down-link channel;

wherein the secondary stations recognize the up-link channel which is currently free from the down-link signal inputted from the down-link channel and sends out the up-link signals onto the free channel;

wherein the master station detects the level of a received signal on each of the up-link channels, and when the level of the received signal is lower than a certain level on any of the up-link channels, the master station recognizes that up-link channel as a free channel, and generates a down-link signal including a transmission enabling command for signaling the free channel to each of the secondary stations and sends out the down-link signal onto the down-link channel; and wherein each of the secondary stations sends out an up-link signal onto the free channel on the basis of the transmission enabling command.

8. A method as claimed in claim 7, wherein when the down-link signal includes a plurality of transmission enabling commands, each of the secondary stations, when holding data to transmit to the master station, determines that there are a plurality of free channels, selects one free channel from among the plurality of free channels at random, and sends out the up-link signal onto the selected up-link channel.

9. A method for controlling access from secondary stations to a master station in a communication system in which the master station and a plurality of the secondary stations can bi-directionally communicate, said method comprising:

wherein the master station is operable to use a down-link channel to transfer a down-link signal, and each of the secondary stations is operable to use a plurality of up-link channels to transfer up-link signals;

wherein the master station detects an unused up-link channel as a free channel; and generates a down-link signal for signaling the detected free channel in order to notify the secondary stations of the detected free channel and sending out the down-link signal onto the down-link channel;

wherein the secondary stations recognize the up-link channel which is currently free from the down-link signal inputted from the down-link channel and sends out the up-link signals onto the free channel;

wherein each of the secondary stations sends out the up-link signal onto the up-link channel assigned thereto with a synchronization pattern set in a predetermined position in the up-link signal, and when not detecting the synchronization pattern from the up-link signal sent on the up-link channel, the master station generates a down-link signal including a collision detection command for signaling an occurrence of a signal collision on the up-link channel and sends out the down-link signal onto the down-link channel; and wherein the secondary station which transmitted the up-link signal suspends the transmission of the up-link signal on the basis of the collision detection command.

10. A method as claimed in claim 9, wherein when having suspended transmission of the up-link signal, each of the secondary stations retransmits the data.

11. A method for controlling access from secondary stations to a master station in a communication system in which the master station and a plurality of the secondary stations can bi-directionally communicate, said method comprising:

wherein said master station is operable to use a down-link channel to transfer down-link signals, and each of the secondary stations is operable to use a plurality of up-link channels to transfer up-link signals;

wherein the master station is operable to detect currently unused one(s) of the up-link channels as free channel (s), which the master station and each of the secondary stations can correctly communicate, and selects one(s) of the secondary stations of a number corresponding to the detected free channel(s); and assigns each of the detected free channel(s) to each of the selected one(s) of the secondary stations;

generates a down-link signal for signaling the free channel(s) in order to notify the selected one(s) of the secondary stations of the free channel(s) and sends out the down-link signal onto the down-link channel; and each of the secondary stations determines whether the up-link channels are assigned thereto on the basis of the down-link signal inputted from the down-link channel.

12. A method as claimed in claim 11, wherein each of the secondary stations send out the up-link signal onto one of the up-link channels assigned thereto only when any of the up-link channels is assigned thereto and each of the secondary stations has data to transmit to the master station.

13. A method as claimed in claim 12, wherein the master station detects whether an up-link signal is being transferred on each of the up-link channels in a certain period after sending out the down-link signal to detect the free channel(s).

14. A method as claimed in claim 13, wherein a certain order for assigning the up-link channels to the secondary stations is determined in advance; and wherein the master station contains the certain order, and selects the secondary stations according to the stored certain order to assign detected free channel(s).

15. A method as claimed in claim 14, wherein the certain order is determined so that all of the secondary stations are equally selected by the master station.

16. A method as claimed in claim 14, wherein the certain order is determined so that a particular secondary station is selected by the master station unequally to other secondary stations.

17. A method as claimed in claim 13, wherein the master station generates a down-link signal including a certain command and sends out the down-link signal onto the down-link channel; and the secondary stations execute processing corresponding to the certain command included in the down-link signal inputted from the down-link channel.

18. A method for controlling access from secondary stations to a master station in a communication system in which the master station and a plurality of the secondary stations can bi-directionally communicate, said method comprising:

wherein the plurality of secondary stations are divided into a plurality of groups;

wherein the master station is operable to use a down-link channel to transfer a down-link signal;

each of the secondary stations belonging to each group is operable to use a plurality of up-link channels assigned to each of the groups to transfer up-link signals;

wherein the master station detects currently unused ones(s) of the up-link channels as free channel(s) which the master station and each of the secondary stations can correctly communicate;

selects one(s) of the secondary stations of a number corresponding to the detected free channel(s) from the secondary stations belonging to the group to which the free channel(s) is/are assigned;

assigns each of the detected free channel(s) to each of the selected one(s) of the secondary stations; and generates a down-link signal for signaling the assigned free channel(s) in order to notify the selected one(s) of the secondary stations of the assigned free channel(s) and sends out the down-link signal onto the down-link channel; and each of the secondary stations determines whether any of the up-link channels are assigned thereto on the basis of the down-link signal inputted from the down-link channel.

19. A method for controlling access from secondary stations to a master station in a communication system in which the master station and a plurality of the secondary stations can bi-directionally communicate, said method comprising:

wherein said master station is operable to use a down-link channel to transfer a down-link signal, and each of the secondary stations is operable to use a plurality of up-link channels to transfer up-link signals;

wherein the master station detects currently unused one(s) of up-link channel(s) as free channels, which the master station and each of the secondary stations can correctly communicate; and generates a down-link signal for signaling the detected free channel(s) in order to notify each of the secondary stations of the detected fee channel(s) and sends out the down-link signal onto the down-link channel;

each of the secondary stations recognizes the up-link channels which is/are the free channel(s) from the down-link signal inputted from the down-link channel and sends out the up-link signals onto the free channel(s).

20. A method as claimed in claim 19, wherein the master station detects the level of a received signal on each up-link channel, and when the level of the received signal has reached or exceeded a certain level on any of the up-link channels, the master station generates a down-link signal including a receive command for signaling that the master station has received the up-link signal and transmits the down-link signal to the secondary station sending out the up-link signal onto that up-link channel; and wherein each of the secondary stations continues to send out the up-link signal on the basis of the receive command.

21. A method for controlling access from secondary stations to a master station in a communication system in which the master station and a plurality of the secondary stations can bi-directionally communicate, said method comprising:

wherein the master station is operable to use a down-link channel to transfer a down-link signal and each of the secondary stations is operable to use a plurality of up-link channels to transfer up-link signals;

wherein the master station detects a condition of use of each of the up-link channels; and determines, on the basis of the condition of use, whether to assign currently unused one(s) of the up-link channels (i.e. free channel(s)), which the master station and each of the secondary stations can correctly communicate, to one(s) of the secondary stations or to signal the free channel(s) to each of the secondary stations;

wherein when having determined to assign the free channel(s) to one(s) of the secondary stations, the master station generates a down-link signal in order to assign the free channel(s) to one(s) of the secondary stations and sends out the down-link signal onto the down-link channel; and when having determined to signal the free channel(s) to each of the secondary stations, the master station generates a down-link signal for signaling the free channel (s) in order to notify each of the secondary stations of the free channel(s) and sends out the down-link signal onto the down-link channel.

22. A method for controlling access from secondary stations to a master station in a communication system in which the master station and a plurality of the secondary stations can bi-directionally communicate, said method comprising:

wherein the master station is operable to use a down-link channel to transfer a down-link signal and each of the secondary stations is operable to use a plurality of up-link channels to transfer up-link signals;

wherein the master station counts a number of currently unused up-link channel(s) (i.e. free channel(s)), which the master station and each of the secondary stations can correctly communicate, and a number of up-link channels currently carrying up-link signals and suffering a communication collision (i.e. a number of communication collision channels);

wherein when the number of communication collision channels has reached or exceeded a first certain number, the master station detects a free channel and assigns the detected free channel to one of the secondary stations;

generates a down-link signal for signaling the free channel assigned to the secondary station, in order to notify the assigned free channel of the secondary station, and sends out the down-link signal onto the down-link channel; and when the number of free channels has reached or exceeded a second certain number, the master station detects a free channel and generates a down-link signal for signaling the detected free channel in order to notify each of the secondary stations of the newly detected free channel and sends out the down-link signal onto the down-link channel.

23. A method as claimed in claim 22, wherein when the number of communication collision channels has reached or exceeded the first certain number, the master station detects free channel(s) and selects one(s) of the secondary stations of a number corresponding to the detected free channel(s), and individually assigns the free channel(s) to the selected secondary station(s).

* * * * *